(12) United States Patent
Toogood et al.

(10) Patent No.: US 10,876,936 B2
(45) Date of Patent: Dec. 29, 2020

(54) THERMAL MODULE FOR A SAMPLE PROCESSING ASSEMBLY

(71) Applicant: LEICA BIOSYSTEMS MELBOURNE PTY LTD, Mount Waverly (AU)

(72) Inventors: Peter Toogood, Vermont (AU); Kenneth Heng-Chong Ng, Donvale (AU); Anthony Favaloro, Richmond (AU); Stephen John Bagnato, Mt. Waverley (AU); Gregory William Boyes, Croydon (AU)

(73) Assignee: LEICA BIOSYSTEMS MELBOURNE PTY LTD, Mount Waverly (AU)

( * ) Notice: Subject to any disclaimer, the term of this patent is extended or adjusted under 35 U.S.C. 154(b) by 581 days.

(21) Appl. No.: 14/648,544

(22) PCT Filed: Dec. 3, 2013

(86) PCT No.: PCT/AU2013/001402
§ 371 (c)(1),
(2) Date: May 29, 2015

(87) PCT Pub. No.: WO2014/085854
PCT Pub. Date: Jun. 12, 2014

(65) Prior Publication Data
US 2015/0308931 A1    Oct. 29, 2015

Related U.S. Application Data

(60) Provisional application No. 61/732,723, filed on Dec. 3, 2012.

(51) Int. Cl.
*B01L 7/00* (2006.01)
*G01N 1/31* (2006.01)
(Continued)

(52) U.S. Cl.
CPC .................. *G01N 1/31* (2013.01); *B01L 7/00* (2013.01); *B01L 7/52* (2013.01); *G01N 1/30* (2013.01);
(Continued)

(58) Field of Classification Search
CPC ................. B01L 7/00; B01L 7/02; B01L 7/52
(Continued)

(56) References Cited

U.S. PATENT DOCUMENTS 5,023,187 A    6/1991    Koebler et al.
6,296,809 B1   10/2001   Richards et al.
(Continued)

FOREIGN PATENT DOCUMENTS

WO    2004/059287 A2    7/2004

OTHER PUBLICATIONS

Communication dated Jul. 6, 2016, from the European Patent Office in counterpart European application No. 13859811.5.

*Primary Examiner* — Jill A Warden
*Assistant Examiner* — Dwayne K Handy
(74) *Attorney, Agent, or Firm* — Sughrue Mion, PLLC

(57) ABSTRACT

A thermal system for controllably altering a temperature within a reaction chamber in a sample processing assembly is described. The reaction chamber is bounded by a substrate and cover member in the sample processing assembly. The thermal system includes at least one thermal generator for generating temperature changes, one or more transfer layers for transferring temperature changes between the thermal generator and the sample on the substrate and a fluid isolator for isolating the thermal generator from fluid dispensed into the reaction chamber.

44 Claims, 15 Drawing Sheets

US 10,876,936 B2

Page 2

(51) Int. Cl.
*G01N 1/44* (2006.01)
*G01N 1/30* (2006.01)
*F28F 3/02* (2006.01)
*F28F 3/12* (2006.01)

(52) U.S. Cl.
CPC .......... *G01N 1/44* (2013.01); *B01L 2200/025* (2013.01); *B01L 2200/141* (2013.01); *B01L 2300/043* (2013.01); *B01L 2300/0822* (2013.01); *B01L 2300/18* (2013.01); *B01L 2300/1822* (2013.01); *B01L 2300/1827* (2013.01); *B01L 2300/1844* (2013.01); *F28F 3/02* (2013.01); *F28F 3/12* (2013.01)

(58) Field of Classification Search
USPC ................. 422/560, 561, 566; 435/303.1
See application file for complete search history.

(56) References Cited

U.S. PATENT DOCUMENTS

| | | |
|---|---|---|
| 2001/0046700 A1 | 11/2001 | Custance et al. |
| 2003/0059349 A1 | 3/2003 | Howe |
| 2004/0086428 A1 | 5/2004 | Loeffler et al. |
| 2005/0042767 A1 | 2/2005 | Machida et al. |
| 2010/0031757 A1 | 2/2010 | Hoyer |

THERMAL MODULE FOR A SAMPLE PROCESSING ASSEMBLY

CROSS REFERENCE TO RELATED APPLICATIONS

This application is a National Stage of International Application No. PCT/AU2013/001402 filed Dec. 3, 2013, claiming priority based on U.S. Patent Application No. 61/732,723 filed Dec. 3, 2012, the contents of all of which are incorporated herein by reference in their entirety.

FIELD OF THE INVENTION

The present invention relates to a thermal module for controlling temperature of a reaction chamber in a slide staining assembly, typically for use in a laboratory instrument, to facilitate automated thermo-controlled staining of samples on slides.

BACKGROUND TO THE INVENTION

Immunohistochemical staining and in situ nucleic acid analysis are tools used in histological diagnosis and the study of tissue morphology. Immunohistochemical staining relies on the specific binding affinity of antibodies with epitopes in tissue samples, and the increasing availability of antibodies which bind specifically with unique epitopes present only in certain types of diseased cellular tissue. Immunohistochemical staining involves a series of treatment steps conducted on a tissue section, typically mounted on a glass slide, to highlight by selective staining certain morphological indicators of disease states.

Typical steps include pre-treatment of the tissue section to reduce non-specific binding, antibody treatment and incubation, enzyme labelled secondary antibody treatment and incubation, substrate reaction with the enzyme to produce a fluorophore or chromophore highlighting areas of the tissue section having epitopes binding with the antibody, counterstaining, and the like. Each of these steps is separated by multiple rinse steps to remove unreacted residual reagent from the prior step. Incubations are typically conducted at ambient temperature of around 18° C. up to around 40° C., while cell conditioning steps are typically conducted at somewhat higher temperatures, e.g. 90° C. to 100° C. In-situ DNA analysis relies upon the specific binding affinity of probes (DNA binding proteins) with unique nucleotide sequences in cell or tissue samples and similarly involves a series of process steps, with a variety of reagents and process temperature requirements. Some specific reactions involve temperatures up to 120° C. to 130° C.

Present systems for regulating slide temperature typically include a heating element bonded to a backing plate. Certain metals used in these heating elements, such as aluminium, are susceptible to degradation when contacted by certain chemicals such as those used in special stains, and exposure of the heating element to these chemicals can reduce or inhibit the operation of the heater. In practice, water and other fluids employed in sample processing may spill over the edges of the slides, and work their way under the heat spreaders where the fluids may boil, causing the heating element to disassociate from the backing plate which in turn diminishes heating efficiency and controllability.

In order to enhance contact between plate and heating element, a thin layer of adhesive may be applied to the surface of the plate. However, even the use of an adhesive may not alleviate the problem of fluid getting under the heat spreader, and impacting the contact between the heater element and the backing plate.

Slide cooling is required in some circumstances, to achieve the temperature differential required for various histological analyses, such as in situ hybridization. In some systems, cooling is achieved by fans that force air past the sample on the slide to remove heat. While this may achieve the desired cooling effect, it can also cause dehydration of the tissue sample on the slide, if rate and duration of air flow is not adequately controlled. Heating and cooling in existing sample processing instruments is still relatively rudimentary and many such systems provide heating and cooling ramp rates that are not efficient or timely.

Furthermore, leakage of reagent onto the heating and cooling elements continues to be a problem in existing systems. Due to the corrosive nature of reagents involved in the staining of biological samples, heating and cooling elements contacted by these reagents are prone to deterioration and, ultimately, failure necessitating regular replacement. This in turn leads to significant and undesirable instrument downtime.

The present application is aimed at overcoming or at least alleviating one or more problems of the prior art.

The discussion of the background to the invention included herein including reference to documents, acts, materials, devices, articles and the like is intended to explain the context of the present invention. This is not to be taken as an admission or a suggestion that any of the material referred to was published, known or part of the common general knowledge as at the priority date of any of the claims.

SUMMARY OF THE INVENTION

Viewed from one aspect, the present invention provides a thermal system for controllably altering a temperature within a reaction chamber in a sample processing assembly, wherein the reaction chamber is bounded by a substrate and cover member in the sample processing assembly, the thermal system including:
 a. at least one thermal generator for generating temperature changes;
 b. one or more transfer layers for transferring temperature changes between the thermal generator and the sample on the substrate; and
 c. a fluid isolator for isolating the thermal generator from fluid dispensed into the reaction chamber.

Typically, the fluid dispensed into the reaction chamber is a reagent which is used during a sample processing procedure. However, other fluids such as water and wash fluid may be dispensed into the reaction chamber, e.g. during a wash phase, and which the fluid isolator isolates from the thermal generator. The at least one thermal generator is typically selected from the group including but not limited to a Peltier, a ceramic heater, a heatable rod, a heatable cartridge and a heatable resistive film to name a few. In a preferred embodiment, the thermal system includes a control interface adapted to communicatively couple the thermal generator with a controller adapted to control temperature changes generated by the thermal generator.

The fluid isolator may include a sealing member between the transfer layer and the thermal generator where the sealing member is configured to substantially preclude fluid ingress into the thermal generator. Alternatively/additionally the fluid isolator may include a fluid impermeable sealing member disposed around the periphery of the transfer layer while permitting contact between the transfer layer and the thermal generator. In one preferred embodiment, at least a periphery of the transfer layer has an edge profile shaped to form at least one passage configured to direct fluid away from the thermal generator. In this arrangement, the sealing member may be disposed around and cooperate with the edge profile of the periphery of the transfer layer creating a path that diverts fluid away from the thermal generator. The fluid isolator may also/otherwise include a fluid impermeable encapsulation layer disposed around the thermal generator.

In a preferred embodiment the thermal system includes a thermal exchanger. The thermal exchanger may include one or more of a heat sink, a fluid-flow cooling system, a refrigerated cooling system and a fan, to name a few. In some embodiments the thermal exchanger may be configured to actively exchange heat with the thermal generator e.g. to achieve faster and/or more efficient sample and/or reaction chamber heating and/or cooling using the thermal system.

Typically, the thermal system includes one or more sensors for determining a temperature within the reaction chamber. At least one sensor may be adapted to be disposed on or in the reaction chamber, or on or in the transfer layer. Preferably, a sensor disposed in one or more locations (e.g. within the transfer layer, within the thermal generator, between the transfer layer and the thermal generator and within a thermal exchanger included with the thermal system), it is disposed so that fluid contact with the sensor is substantially precluded. The sensor may determine the temperature directly or indirectly using a measured parameter such as, e.g. resistance trace. In an embodiment where the thermal generator includes a heatable resistive film, the sensor may be incorporated into the heatable resistive film. In some embodiments, the at least one thermal generator may include a self-regulating resistive heater, wherein changes in resistivity are indicative of a sample temperature and, optionally, directly control voltage and/or current delivered to the heater to achieve a required temperature set point.

Preferably, the thermal generator is a Peltier device or thermoelectric device which is configured to generate higher temperatures towards its outer edges to compensate for thermal losses occurring at the edges of other components of the thermal system such as the transfer layer(s) due to conductivity and/or atmospheric exposure. The Peltier includes an array of Peltier semiconductor couples that are sandwiched between a pair of ceramic plates. Preferably, at least one of the ceramic plates includes an array of stress-relieving features facing outward, i.e. away from the Peltier couples. The stress-relieving features may include e.g. cross-hatchings etched or cut into the outward-facing surface of one or both of the ceramic Peltier plates. In one embodiment, the stress-relieving features are cuts made through the entire thickness of the ceramic layer, such that it resembles an array of ceramic tiles. These stress-relieving features relieve stresses and/or strains on the Peltier during use and allow for thermal expansion, thereby increasing reliability of the Peltier device. Ideally, at least the ceramic plate which is on the transfer layer side of the thermal system incorporates stress-relieving structures.

In some embodiments, the transfer layer includes one or more recesses adapted to be arranged substantially co-linearly with at least part of an interior wall of a cover member when retained by the sample processing assembly in a closed configuration, the one or more recesses facilitating cleaning of reagent from at least part of the cover member interior wall.

The transfer layer may also include one or more expansion structures causing one or more edge portions of the transfer layer to heat faster than a centre portion thereof. The expansion structures may be selected from the group including a void, channel, rut or opening. The transfer layer may also include an opening couplable with a fluid flow path facilitating fluid transfer between the opening and a fluid source.

In some embodiments, the thermal system includes one or more first guide means disposed on the transfer layer and configured to limit movement of a substrate in at least a first direction during placement of a substrate on the transfer layer. One or more second guide means may be disposed on the transfer layer and configured to limit movement of a substrate in at least a second direction, different to the first direction, during placement of a substrate on the transfer layer.

In some embodiments, at least the thermal generator and the transfer layer are incorporated into a thermal module, and each of a plurality of thermal modules is adapted for use with individual ones of a plurality of sample processing assemblies provided in a sample processing instrument. Ideally, the instrument is controllable to process samples disposed on individual substrates located in individual sample processing assemblies. Each thermal module may be individually controllable by a controller controlling operation of the instrument. Ideally, a thermal module adapted for use with a sample processing assembly is interchangeable independently of other thermal modules provided in the instrument. In some embodiments, a plurality of components in the thermal system is disposed in a stacked construction which is readily dis-assemblable and re-assemblable to interchange parts thereof.

In some embodiments, retaining means are provided and are operable for maintaining functional contact between stacked components of the thermal system. The retaining means may include one or more of a clamp, a spring and screw means adapted to increase functional contact between at least two of the thermal generator, the transfer layer and a thermal exchanger when the retaining means is activated. Ideally, the retaining means is adapted to apply a retaining force of more than 80 kg, preferably more than 100 kg and ideally about 150 kg, between stacked components of the thermal system. Preferably, the retaining force is applied along a longitudinal dimension of the thermal system to limit bowing and/or formation of fractures and micro-fractures in components of the thermal system. In some embodiments, the retaining means includes a resilient member adapted to be compressed between a transfer layer of the thermal system and a retaining clip on an opposing side of the thermal generator, the retaining clip having a rigid base for contacting the resilient member and legs that are adapted to couple with the transfer layer to retain stacked components of the thermal system in functional contact.

In some embodiments, the thermal system may be incorporated into a two stage thermal system which includes secondary thermal generator adapted to alter a temperature of samples disposed on individual ones of a plurality of individual substrates substantially simultaneously. Ideally, temperature within the buffer region may be altered between ambient temperature and about 40 to 75° C. The secondary thermal generator may be disposed e.g. in a buffer region of a sample processing instrument which is adapted to move individual ones of said substrates from the buffer region to individual ones of said sample processing assemblies provided in the instrument. The secondary thermal generator may include e.g. a Positive Temperature Control (PTC) heater.

BRIEF DESCRIPTION OF THE DRAWINGS

The present invention will now be described in greater detail with reference to the accompanying drawings. It is to be understood that the embodiments shown are examples only and are not to be taken as limiting the scope of the invention as defined in the claims appended hereto.

DETAILED DESCRIPTION

Figure 1:
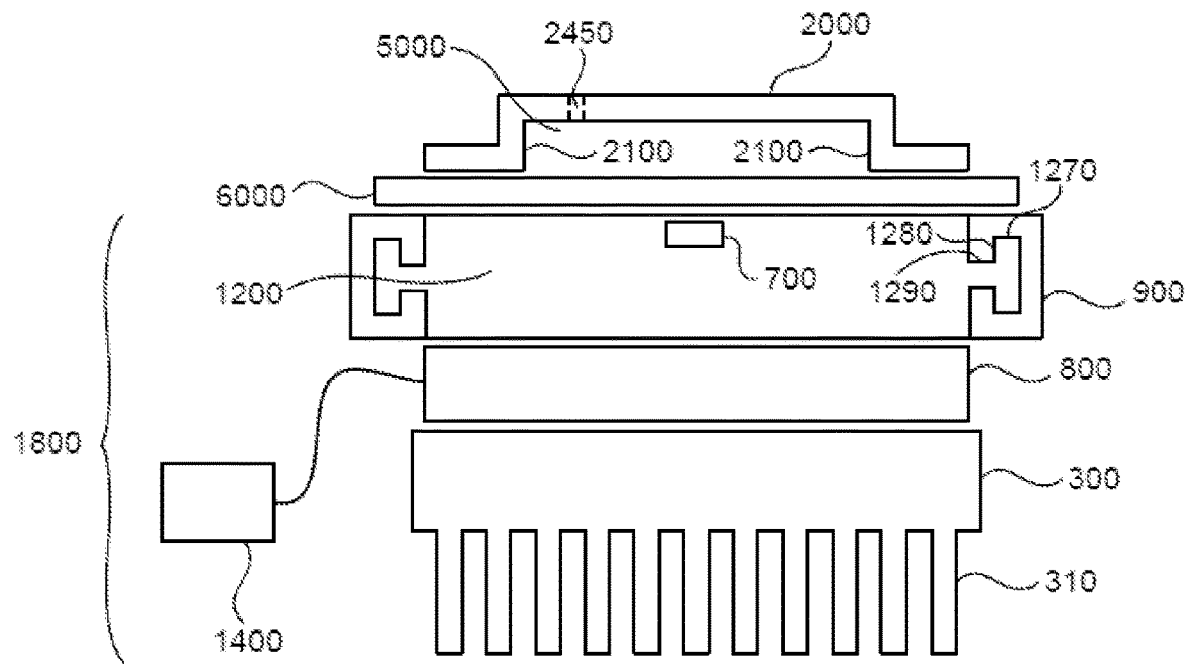
FIG. 1 is a schematic illustration showing features of a thermal system according to an embodiment of the invention.

FIG. 1 is a schematic illustration showing a thermal system in the form of a thermal module 1800 according to an embodiment of the invention. Positioned over thermal module 1800 is a substrate 6000 (typically in the form of a pathology slide) to which a sample has been applied for processing, and a cover member 2000. Cover member 2000 has internal walls 2100 forming a void which, together with substrate 6000 and may include a sealing means (not shown) to form a reaction chamber 5000. Reagent, typically fluid reagent, is dispensed via fluid flow port 2450 into reaction chamber 5000 as part of treatment steps used in processing of the sample on substrate 6000. Those treatment steps may involve agitating, heating, and/or cooling the reagent before it is evacuated from chamber 5000. The present invention is aimed at systems and apparatus for controllably altering the temperature of the sample and/or fluid in the reaction chamber, during processing.

Thermal module 1800 includes at least one thermal generator 800 for producing temperature changes. Often this will involve active heating although active cooling may be required in some treatment steps. Transfer layer 1200 is situated between thermal generator 800 and substrate 6000 and provides a heat-conducting platform for supporting the substrate while enabling substantially even distribution of thermal changes (typically heating) generated by the thermal generator. Ideally, transfer layer 1200 comprises a material such as anodised aluminium or certain ceramics, which have high thermal conductivity, so that temperature cycling is transmitted efficiently to reaction chamber 5000. That is, temperature gradients from thermal generator 800 are not lessened significantly by transfer layer 1200. Ideally, transfer layer 1200 is also somewhat resistant to corrosion or degradation from reagents dispensed into reaction chamber 5000.

Other suitable materials for the transfer layer 1200 include certain ceramics, copper, and some thermally conductive plastics, stainless steel, coated aluminium alloys (electroless nickel or anodising) or combinations of these. In some embodiments a thermal interface material is provided between the thermal generator 800 and the thermal transfer layer 1200 to improve thermal coupling during use. Non-abrasive, thermally conductive, non-dynamic (i.e. static) and/or non-migratable materials such as graphite foil are suitable. Other suitable materials may include thermal grease, thermal gel, conductive pads, and/or other phase change materials to name a few. In some embodiments, transfer layer 1200 may incorporate features such openings, ruts and/or voids to allow for thermal expansion effects in the material and to provide even heat distribution across the staining area of substrate 6000. In one or more embodiments transfer layer 1200 and thermal generator 800 are provided together, in a single device omitting a layer from the structure shown in FIGS. 1 and 2.

A fluid isolator 900 is provided to isolate thermal generator 800 from reagent that is dispensed onto substrate 6000. In prior art sample processing devices, fluid leakage has been known to cause deterioration of thermal devices used to modify the temperature of samples during treatment steps. In the present invention, fluid isolator 900 substantially precludes reagent or other fluid dispensed into reaction chamber 5000 from encountering thermal generator 800, thereby protecting the thermal generator and optimising serviceable lifetime. Fluid isolator 900 may take many forms such as, for example, a somewhat traditional water impermeable conformal layer providing a physical barrier that isolates or encapsulates thermal generator 800 from substrate 6000 and reagent dispensed through cover member 2000 into reaction chamber 5000. Alternatively/additionally, a fluid isolator 9000 may encapsulate at least part of substrate 6000 and reaction chamber 6000 in a fluid impermeable layer to isolate fluid from thermal generator 800. In another embodiment, one or more sealing members such as gaskets, sealant, O-rings or other hermetic members may be provided around the thermal generator 800 or other components of the thermal module, to provide fluid isolation during use.

Figure 2:
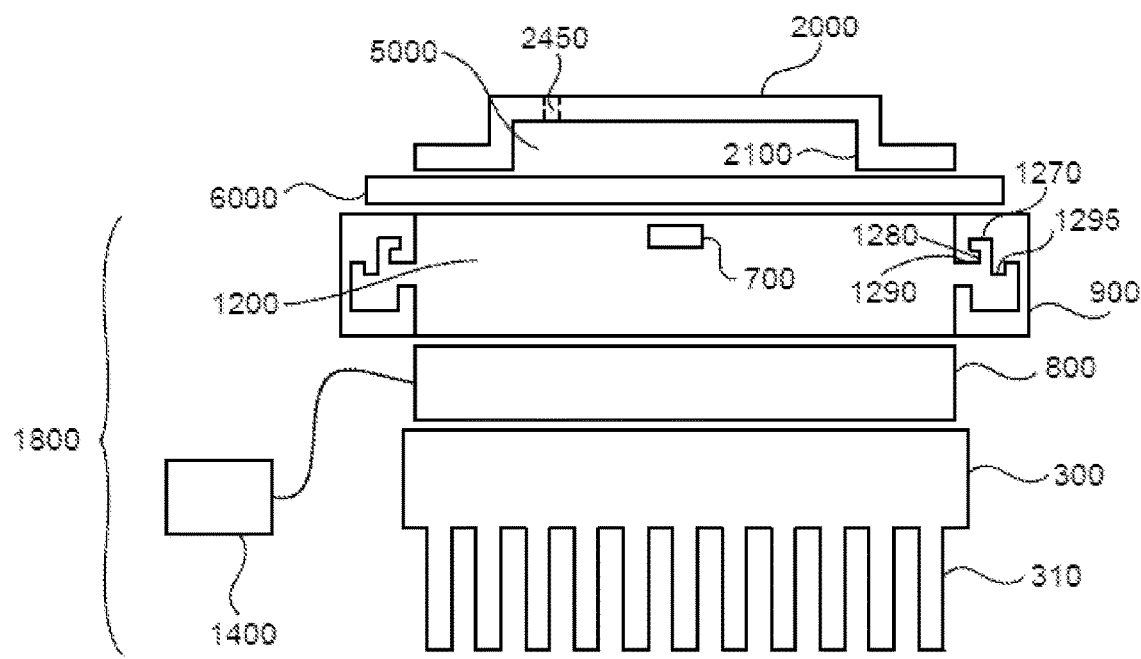
FIG. 2 is a schematic illustration showing features of a thermal system according to another embodiment of the invention.

The embodiments in FIGS. 1 and 2 show a different approach. Here, the fluid isolator takes the form of a fluid impermeable sealing member 900 which is disposed around the periphery of transfer layer 1200 and is made from a somewhat compliant and chemically inert material that may be over-moulded or co-moulding during manufacturing. Ideally, contact between transfer layer 1200 and substrate 6000 remains possible, as shown, for maximal thermal transfer between transfer layer 1200 and reaction chamber 5000, via substrate 6000. The periphery of transfer layer 1200 has an edge profile which is shaped to form at least one passage or channel 1290 which is configured to direct fluid passing under substrate 6000 away from thermal generator 800. Ideally, the edge profile of transfer layer 1200 provides a tortuous path that makes it difficult for fluid to flow, under gravity or pressure, from the tortuous path to beneath the transfer layer where thermal generator 800 is located.

In some embodiments transfer layer 1200 is structured to heat the edges faster than the centre of the layer. This is believed to force the direction of heat transfer from the edges toward the centre of the layer and minimise bending of the transfer layer, which could otherwise occur if the centre of the transfer layer gets hotter at a faster rate than the edges. This structure may include a void, channel, rut or opening in the transfer layer.

In the embodiment shown in FIG. 1, channel 1290 forms a moat or gutter that holds leaked fluid, preventing it from passing down the external walls of transfer layer 1200. In order for leaked fluid to pass the sealing member 900, leaked fluid must seep up wall 1280 across ledge 1270 and then follow the rest of the contours in the shaped profile in the periphery of the transfer layer. Similarly, in FIG. 2, channel 1290 captures leaked fluid. If that fluid seeps up wall 1280 and across ledge 1270, it is captured by a second channel 1295. The tortuous fluid pathway created by the shaped profile around the periphery of transfer layer 1200 substantially precludes fluid from crossing the transfer layer and coming into contact with thermal generator 800. Ideally, sealing member 900 disposed around the periphery of transfer layer 1200 is correspondingly shaped on an inside wall so as to cooperate with the shape profile of the periphery of the transfer layer.

Transfer layer 1200 is coupled with thermal generator 800 to achieve transfer of heat (and cooling) from the thermal generator to reaction chamber 5000. Coupling between transfer layer 1200 and thermal generator 800 may be direct, i.e. where the two components are in direct physical contact. Alternatively/additionally, they may be coupled using thermal paste, thermal grease, graphite, foils, adhesives or the like, or a combination of these. These materials can help to overcome slight unevenness or irregularities in the facing surfaces of heat generator 800 and transfer layer 1200. In one embodiment, coupling between transfer layer 1200 and thermal generator 800 may be enhanced by way of retaining means such as one or more clamps, screws, sprung clips or the like which can minimise formation of pockets of uneven temperature (i.e. hot and/or cold pockets) across transfer layer 1200. An example of retaining means is described later, in relation to the embodiment illustrated in FIGS. 15, 16 and 17.

Thermal generator 800 may employ one or more different heating principles and may incorporate one or more of e.g. a Peltier heater, a ceramic heater, a heatable cartridge and/or heatable resistive film. Some of these are discussed in more detail below. Ideally, thermal generator 800 is adapted to modify temperatures within the reaction chamber to a maximum of about 130° C. In a preferred embodiment, thermal generator 800 is also adapted to cool the reaction chamber, as may be required for particular treatment steps in a sample processing assay. Ideally, the rate of temperature change generated by thermal generator 800 is sufficiently quick that temperature ramp time has little or no effect on the treatment step. In one embodiment, ramp times of +/−1° C. per second are suitable although ramp times of greater +/−3° C. per second are preferable and ramp times of +/−5° C. per second are more preferable still. Faster ramp times may be achievable in future, such as e.g. +/−10° C. per second. Accuracy is also an important factor, as is repeatability of temperatures generated.

A Peltier heater is a thermoelectric module which is suitable for use as a thermal generator according to embodiments of the present invention. This is a solid state device that functions as a heat pump. Typically, it incorporates an array of small Bismuth telluride cubes (couples) sandwiched between two ceramic plates. A direct current (DC) is applied to the device and energy is pumped from one side of the device to the other. In most embodiments, the Peltier has a $V_{max}$ of about 12 to 24 V, preferably 15 to 17 V when drawing 3 to 8 Amps, preferably 4 Amps (load dependent) although other operational characteristics may be suitable in some applications.

When heating reaction chamber 5000, energy is pumped from the heat exchanger 300 to the transfer layer 1200. When cooling reaction chamber 5000, energy is pumped from the transfer layer 1200 to the heat exchanger 300. Cooling is achieved by reversing the DC polarity. Advantageously, the Peltier has the capability to actively heat and cool in a single device, which means it can be controlled to any given temperature with a much tighter tolerance, by controlling magnitude and direction of the current applied to it, such as by toggling. Toggling, for example, may be applied by reversing polarity as temperature rises or lowers accordingly.

Peltier heaters possess the further advantages of having no moving parts, exhibiting no noise or vibration and have more precise thermal control when compared with resistive heating devices and cooling devices that use compressors. Traditionally, Peltier heaters have been somewhat unreliable because of fracture issues arising from frequent thermal cycling. However, improvements in Peltier technology have mitigated these problems. However, in preferred embodiments, reliability may be increased by providing stress-relieving structures on the surface of one of or both of the ceramic layers of the Peltier which face outward, i.e. away from the Peltier couples. The stress-relieving structures may be e.g. cross-hatchings etched or cut into the outward-facing surface of the ceramic Peltier plates. In some embodiments the cuts are through the entire thickness of the ceramic layer, forming an array of ceramic tiles. Ideally, at least the ceramic plate which is on the transfer layer side of the thermal system incorporates this stress-relieving structure.

Figure 5:
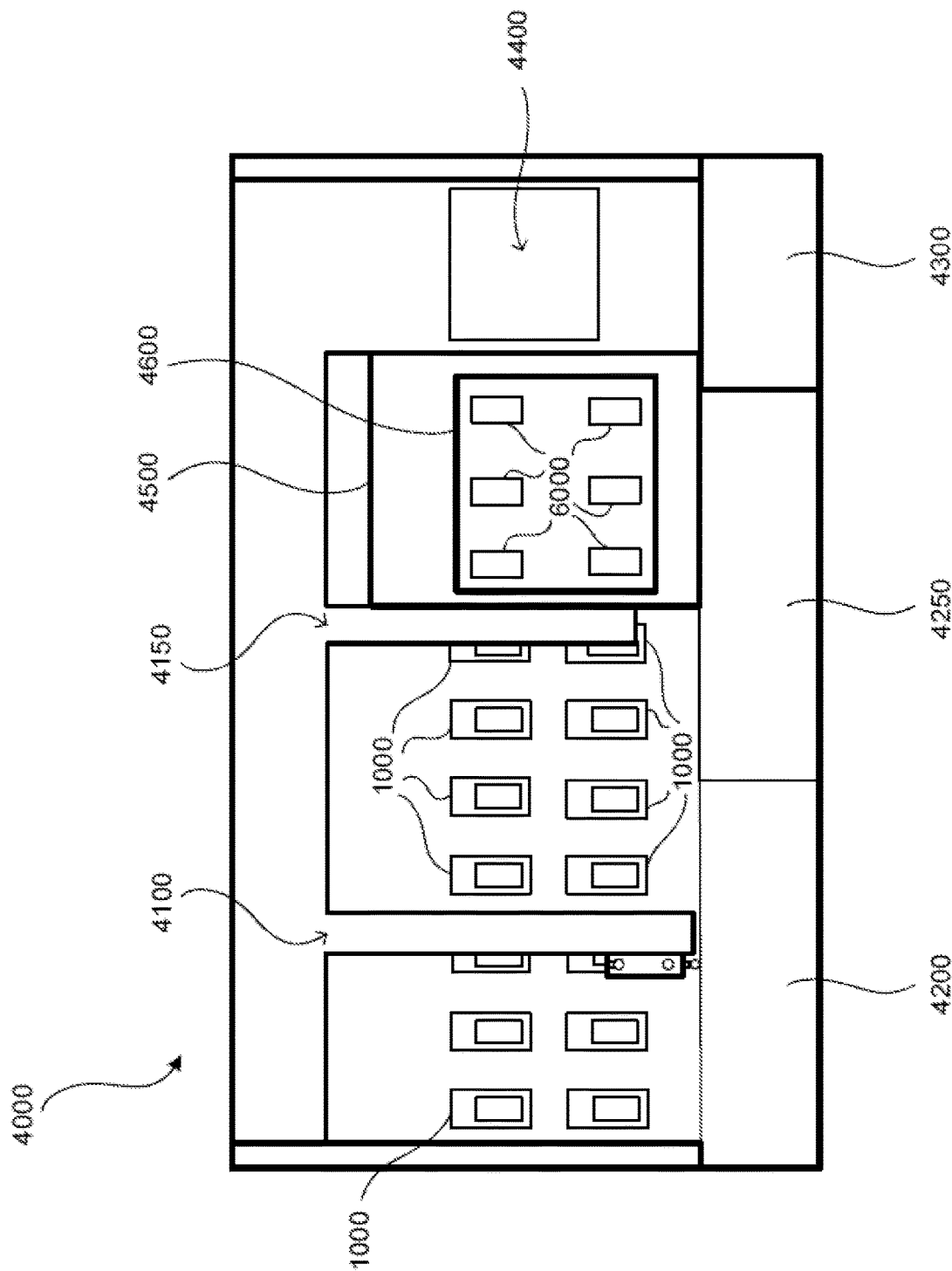
FIG. 5 is a schematic illustration of an instrument with which a thermal system according to embodiments of the present invention may be used.

Ideally, operation of thermal generator 800 is controlled via a control interface 1400 that provides the thermal generator with control signals for raising or lowering temperature according to a user's requirements. The user's requirements may be captured using an input device (not shown) in communication with a controller 4400 (FIG. 5) which ultimately provides control signals to control interface 1400.

In a preferred embodiment, control interface 1400 includes a drive circuit that smooths the voltage applied to the Peltier during operation. In one embodiment, the drive circuit includes an inductor/capacitor filter that smooths the DC output ripple to within about 5%, preferably within 3% and more preferably within about 1% of the maximum value. This limits the amount of cycling applied to the Peltier, potentially extending its serviceable life while also enabling more efficient operation.

Typically, one or more sensors are provided to ascertain a temperature within thermal module 1800. Ideally, the sensor output is indicative of a temperature within reaction chamber 5000. That temperature may be determined directly by locating a sensor 700 within reaction chamber 5000 or on an internal wall 2100 of the cover member, or in direct contact with the substrate 6000 forming the reaction chamber. The sensor may be located on a top or bottom surface of substrate 6000, or it may be embedded within the substrate or within cover member 2000.

Alternatively, one or more sensors may be provided to measure the temperature of transfer layer 1200 and/or the thermal generator 800 and/or a thermal interface material between them and control interface 1400 and/or controller 4400 may derive from the measured value (e.g. using algorithms modelling the thermal behaviour of the various layers), an estimate of the temperature within reaction chamber 5000. Alternatively, an offset can be employed to compensate for the fact that sensor 700 is not located directly within the reaction chamber itself. In a further alternative, the controller 4400 may behave as a sensor by deriving a temperature estimate from a resistive heater trace of heating signals to determine indirectly the temperature in the reaction chamber. In a further alternative, the resistive heater may be configured to self-regulate, where changes in resistivity reflect changes in transfer layer or sample temperature and directly control the amount of power delivered to the heater to achieve a required temperature set point within the reaction chamber.

Thus, sensed temperature (sensed directly or indirectly) can be used by controller 4400 to modify the control signal communicated to the control interface 1400 in a closed loop feedback system to ensure that the temperature changes generated by thermal generator 800 give rise to a temperature within reaction chamber 5000 that is close to the required reaction temperature. Ideally, controller 4400 includes or is associated with data storage means for accessing and storing temperature set point data as well as storing time-logged sensor data obtained from individual sensors in the instrument. This data can be used in logs generated by the instrument.

In some examples, deterministic heating protocols are used to provide fine control over the sample and/or reaction chamber temperature, as well as the rate of heating and/or cooling, to ensure consistency between different samples heated using different thermal modules on an instrument. In such embodiments, it may be desirable to provide a plurality of thermal sensors in the device. Whilst accurate temperature readings may be obtained from a sensor located inside the reaction chamber, this is impractical due to the amount of fluid and other agents likely to be present which cause sensor degradation. Placement of one or more sensors in the underside of the transfer layer on which a sample substrate (slide) sits is likely to mitigate sensor damage from contact with reagents and the like. Ideally such sensors rest in correspondingly shaped voids or nests in the underside of the transfer layer.

In one embodiment, a sensor 700 is provided just below the surface of transfer layer 1200, as shown in FIGS. 1 and 2. Thus, sensor 700 is protected from reagent leakage and wash fluid utilised during a wash phase (as described below) which could otherwise cause sensor degradation. In some embodiments, sensor 700 is a printable sensor that is readily printed onto a surface of substrate 6000, cover member 2000 or transfer layer 1200. Alternatively, sensor 700 (or additional sensors when provided) may be integrated into the thermal generator 800, or a heat exchanger 300 (described below). Any suitable sensing technique may be employed such as e.g. resistive, infra-red, laser and laser scanning temperature sensing to name a few.

Preferably, thermal module 1800 includes heat exchanger 300 for removal of heat from the system. Heat exchanger 300 may include one or more elements such as a heat sink 310, a fluid flow cooling system and an air flow cooling system to name a few. In one embodiment, heat exchanger 300 includes a fluid thermal exchange system utilising fluid with a high boiling point (or anti-boil formulation and/or anti-corrosive and/or anti-bacterial) to remove heat from the thermal generator via the heat exchanger, although use of water and other fluids is also contemplated. Where thermal module 1800 is provided as part of a module incorporated with individual sample processing assemblies in an instrument such as instrument 4000 illustrated in FIG. 5, fluid circulated through the heat exchanger of an individual thermal module may be reticulated to other modules on the instrument. Alternatively/additionally, it may be reticulated to other regions of the instrument such as a warming buffer or holding area where it may be desirable to use heat drawn from the heat exchanger to warm other samples or fluids on board the instrument 4000.

Alternatively/additionally, heat exchanger 300 may incorporate an exchange block and, optionally, fins 310 which increase the total surface area of the exchanger from which heat may be dissipated. Exchange block materials may comprise e.g. copper or a thicker aluminium body. Where multiple finned heat sinks are provided in an instrument, they may be oriented to align fins for efficiency of heat exchange. This may be particularly useful for finned heat sinks used with a secondary thermal generator as described below where fine control over the temperature of individual samples is not necessarily required. An example of thermal module in which fins 310 are omitted and from the thermal exchanger 300 which instead employs a fluid cooling technique is provided in FIGS. 15 to 17.

Thus, part of the heat exchanger 300 may include fluid flow channels formed internally, through which heat exchanging fluid is circulated. Where cooling fluid is used, thermal generator 800 is ideally isolated (e.g. hermetically sealed) from fluids to avoid risk of degradation by contact with the fluid. Alternatively/additionally, air circulation may be employed by the heat exchanger 300 to remove heat from the thermal system. Air circulated by the heat exchanger may be ambient air, or refrigerated air from an evaporator, or cooled air from another type of cooling system on board the instrument or in communication with it.

Heat exchanger 300 and/or heat sink 310 may comprise a material which has high thermal conductivity such as metals (for example aluminium, anodised aluminium, copper, tungsten, molybdenum), carbon, graphite, ceramics (incorporating ceramic particles such as aluminium nitride (AlN) and silicon carbide), diamond, metal-matrix composites, carbon-matrix composites, ceramic-matrix composites and combinations thereof.

In some embodiments, the thermal module may comprise thermal interface materials between various layers of the thermal module such as a thermal fluid, thermal grease, thermal conductor, solder, graphite foil or combinations thereof. A thermal interface material may be provided e.g. between the thermal generator and the thermal transfer layer to improve thermal coupling during use. In the embodiment shown in FIGS. 15 to 17, a thermal transfer layer may be provided between the Peltier and the heat spreader for enhancing thermal coupling and heat transfer from the Peltier to the reaction chamber (not shown). Ideally, the thermal interface is between 1 and 150 microns thick and more preferably, about 125 microns thick for a material such as a graphite foil. Non-abrasive, thermally conductive, non-dynamic (i.e. static) and/or non-migratable materials such as graphite foil are ideal although the thermal transfer layer is not limited to this material. Alternatively/additionally, a thermal interface material may be provided between the thermal generator (Peltier) 800 and the thermal exchanger (heat sink) 300.

Figure 4:
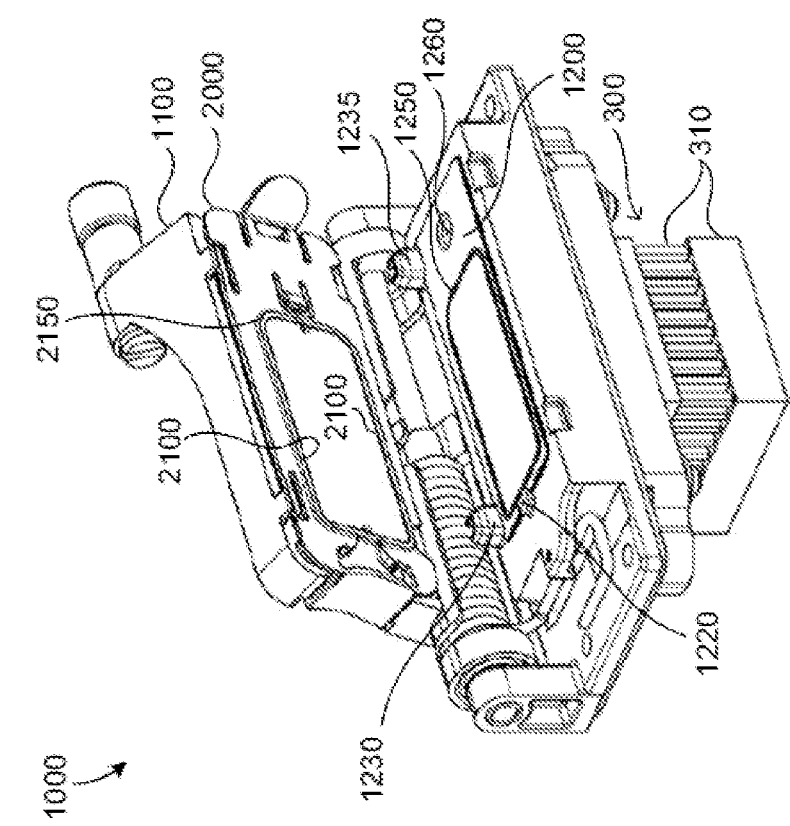
FIG. 4 shows the sample processing assembly of FIG. 3 viewed from the front and in an open configuration.
Figure 3:
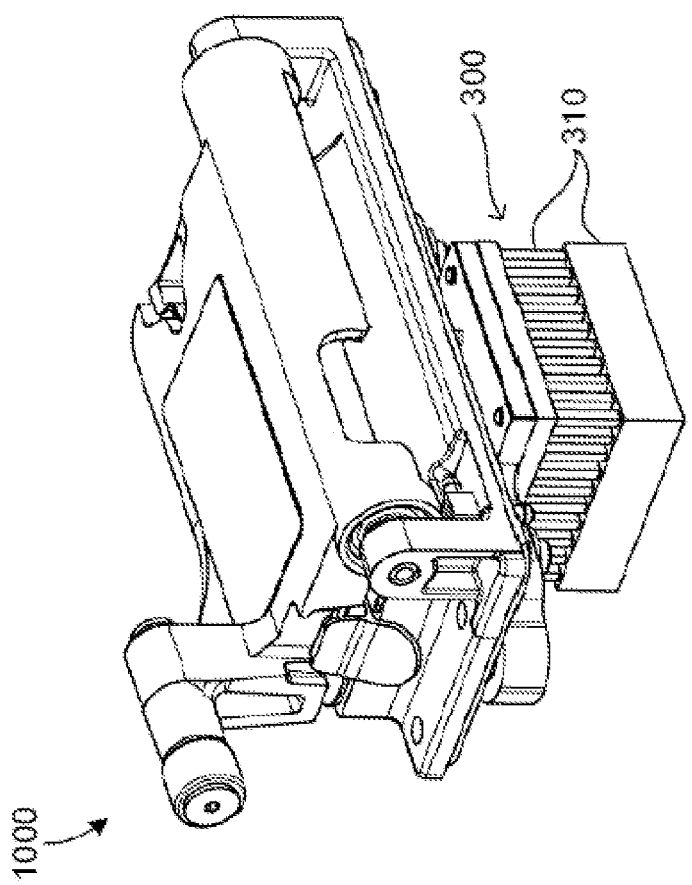
FIG. 3 is a schematic illustration of a sample processing assembly viewed from the rear and incorporating a thermal module according to an embodiment of the present invention, with the assembly in a closed configuration

As indicated above, thermal generator 800 and transfer layer 1200 and optionally, heat exchanger 300 may be incorporated into a thermal module which is configured for use with a sample processing assembly 1000 of the type shown in FIGS. 3 and 4. Typically, several such sample processing assemblies 1000 are provided in a sample processing instrument 4000 of the type illustrated schematically in FIG. 5. As shown in FIGS. 3 and 4, an individual sample processing assembly 1000 is associated with an individual thermal module 1800 for controllably altering the temperature of a reaction chamber formed in the assembly.

Typically, a reaction chamber 5000 is formed by placement of a cover member 2000 over a substrate 6000. However, it is to be understood that cover member 2000 need not be required; the present invention may be utilised to controllably vary the temperature of an open reaction chamber comprised of reagent dispensed on a slide/substrate carrying a sample to be treated. Alternatively, reaction chamber 5000 may be formed by a cover member 2000 placed directly over transfer layer 1200 without a substrate 6000 as may be the case e.g. during washing of internal walls 2100 and/or sealing component of cover member 2000.

FIG. 3 illustrates sample processing assembly 1000 with thermal module 1800 from the rear in a closed configuration. FIG. 4 shows assembly 1000 from the front and in an open configuration with cover member 2000 retained in closure body 1100. Further details of sample processing assembly 1000 and variations of it are described in U.S. provisional patent application No. 61/721,280 filed on 1 Nov. 2012 and International patent application no. PCT/AU2013/001267 filed on 1 Nov. 2013, both entitled "Slide Staining Assembly and Cover Member", the entire contents of both which are hereby incorporated herein by reference.

In the embodiments described, transfer layer 1200 may also be considered a "mounting surface" for substrate 6000 carrying a sample to be processed by assembly 1000. Transfer layer 1200 may include one or more first guide means in the form of a protrusion or post 1220 to limit movement of substrate 6000 in at least a first direction. Thus, when the substrate is placed, it slides across transfer layer 1200 until it reaches first guide 1220 which provides a datum point limiting further movement. Further first guide means may be provided if necessary.

In a preferred embodiment, one or more second guide means 1230, 1235 are also provided, typically in the form of protrusions or posts on the transfer layer 1200, to limit movement of substrate 6000 in a second direction which is typically orthogonal to the first direction. Second guide means 1230, 1235 provide further datum points to optimise placement of substrate 6000 within sample processing assembly 1000. Ideally the one or more second guides 1230, 1235 are shaped to cooperate with corresponding notches in a cover member 2000 when retained in closure body 1100 of assembly 1000 for optimal alignment of the cover member 2000 over the substrate to form a reaction chamber. In some embodiments, the sample processing assembly includes biasing means and/or a detent and cooperating detention arm for biasing the assembly in the closed position whilst also facilitating automated opening by a robotic arm provided with an instrument housing one or more of the sample processing assemblies.

When cover member 2000 is retained in the sample processing assembly 1000, a number of processing steps can be conducted. In some steps, it may be desirable to "wash" inside the reaction chamber using a cleaning solution including components such as e.g. water (including distilled, double distilled, deionized and other variations of water), detergents, salts, enzymes, oxidizers, disinfectants, surfactants, emulsifiers etc. Cleaning may be achieved with or without a sample-carrying substrate in the assembly. In the absence of a substrate, cover member 2000 forms a wash chamber with transfer layer 1200. In either case, wash fluid can be applied through fluid port 2450 in cover member 2000 or fluid flow opening 1260 in transfer layer 1200.

Complete washing of cover member 2000 may take place between processing of distinct samples, when substrate 6000 has been removed from the sample processing assembly 1000. The effectiveness of washing may be enhanced by providing one or more recesses 1250 in transfer layer 1200. Here, recess 1250 is arranged co-linearly with internal walls 2100 of cover member 2000 when retained by closure body 1100 in a substantially closed position. In this case, reaction chamber 5000 is configured to facilitate washing of internal walls 2100 and sealing surface 2150 of cover member 2000 so that there is minimal carryover of debris and/or build-up from processing steps performed during one assay, into a subsequent assay. Beneficially, complete washing of cover member 2000 can be conducted while retained within assembly 1000, thereby eliminating manual washing. Washing may be enhanced by modifying (increasing) the temperature within reaction chamber 5000 during washing to activate enzymes and other thermo-active constituents in the wash reagent. Wash reagent may be collected via an opening 1260 in transfer layer 1200, or via fluid flow ports in cover member 2000.

Fluid flow opening 1260 may be couplable with a fluid flow path (not shown) facilitating fluid transfer between fluid flow opening 1260 in transfer layer 1200 and a fluid source, including e.g. a negative pressure source, for draining reagent from wash chamber 5000. Alternatively, wash reagent may be delivered and withdrawn through fluid flow openings 1260 or though openings in the cover member 2000. Collected wash reagent may be redirected to a waste container/drain or for recycling. A vacuum may also be applied through fluid flow opening 1260 to retain a substrate positioned on mounting surface 1200 when in use. This may assist during separation of cover member 2000 from substrate 6000 during initial opening of the assembly 1000 i.e. to overcome surface tension or sticktion forces between the substrate and cover member.

The thermal module 1800, may give rise to power savings for instruments incorporating the thermal module, when used to perform certain protocols, such as an immunohistochemistry staining protocol. Power savings of 1 to 200 W or more may be achieved across an immunohistochemistry protocol compared to instruments (such as the Leica BOND-III fully automated immunohistochemistry and in situ hybridization stainer instrument) running the same or similar protocols using existing heating technologies. Currently available commercial automated stainer instruments have a power budget up to 1500 to 2500 W from a single phase supply. Use of the thermal module disclosed herein provides the opportunity to reduce instrument power consumption giving rise to potentially significant cost savings.

Figure 14:
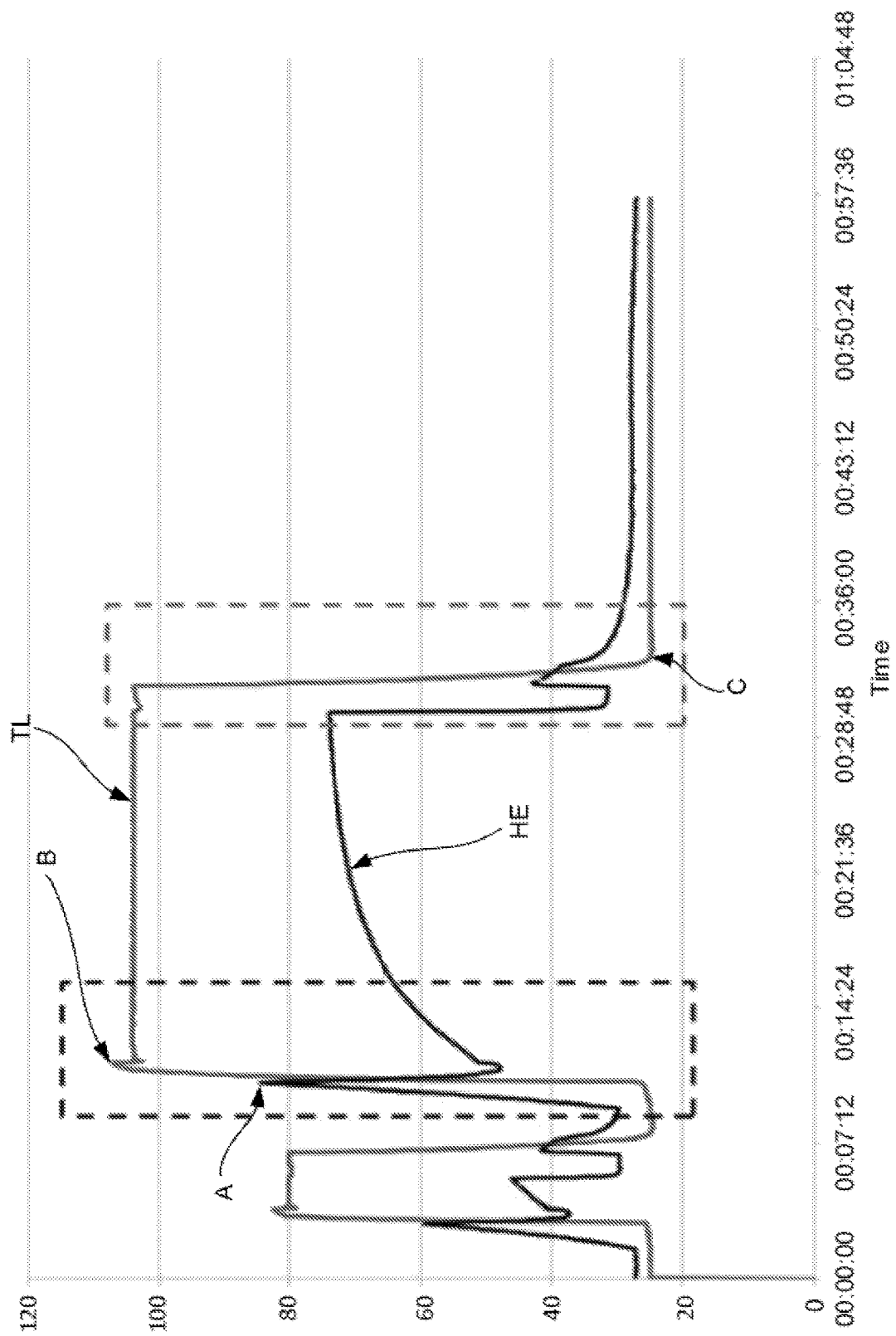
FIG. 14 chart transfer layer temperature and heat exchanger temperature over time for prolonged incubations for a thermal module having a Peltier and active heat exchanging with the heat exchanger.

The power savings may be obtained in embodiments maximising the efficiency and effectiveness of the thermal module by incorporating a Peltier. Without being limited by theory, it is considered that a thermal module 1800 incorporating a Peltier works particularly efficiently when the temperature difference between the transfer layer 1200 and the heat exchanger 310 is lower. As this temperature gradient increases, the same amount of power inputted to the Peltier is able to pump less energy from one side of the Peltier to the other therefore, reducing the temperature gradient reduces the amount of power consumed. If the heat exchanger is much hotter than the transfer layer, then it is harder to maintain a lower temperature at the transfer layer. However once a heating step starts, a warmer heat exchanger makes it faster and more efficient to heat the transfer layer. This phenomenon is somewhat like "rubber band" effect, boosting the performance of the Peltier in the thermal module. Similarly, if the transfer layer is already hot, cooling the heat exchanger temperature down to a lower temperature, such as ambient temperature, makes it faster and more efficient to cool the transfer layer once the cooling step of the protocol has commenced. FIG. 14 illustrates this graphically.

FIG. 14 illustrates the effect of active heat exchanger control on Peltier performance, charting the transfer layer temperature TL and heat exchanger temperature HE for prolonged incubations. In the example shown, the heat exchanger was warmed to 25° C., 37° C. and 80° C. and maintained at each of those temperatures for a period of time by toggling a fluid valve, such as a water or pneumatic valve (to ambient temperature fluid) enabling the exchanger to maintain those temperatures.

Before a heating step, any fluid cooling to the heat exchanger was stopped, enabling the exchanger to start warming. Approximately 60 to 80 seconds before the Peltier was activated to heat the sample, the heat exchanger reached 85° C. (point A). It is to be noted that the 60 to 80 second period could be shortened by actively warming the exchanger using warm or hot fluid, for example, rather than using heat dissipated from the Peltier to warm the heat exchanger. The Peltier was then activated to heat the transfer layer to 104° C. (point B) in approximately 40 seconds. The time to heat to above 100° C. is markedly shorter than existing instruments, and shorter heat-up times again may be achievable by optimising the thermal properties of other components of the thermal module and the sample processing assembly with which it is used, Approximately 20 seconds prior to cooling the Peltier from 104° C. the heat exchanger was cooled to 27° C. by opening the fluid flow valve. This allowed the transfer layer to cool to 25° C. (point C) in approximately 50 to 70 seconds.

Thus in some embodiments, heat exchanger 310 is adapted to actively exchange thermal energy with the thermal generator 800 for improved thermal control at the transfer layer 1200, including faster and more efficient heating and cooling. Operation of the heat exchanger for active thermal exchange may be under the control of controller 4400, or a sub-controller associated with the thermal module and coupled with the Peltier and/or a device determining/deriving the transfer layer temperature. The heat exchanger may be coupled with one or more heating or cooling systems such as air, liquid, induction, infra-red, high frequency or other systems to name a few.

Figure 15:
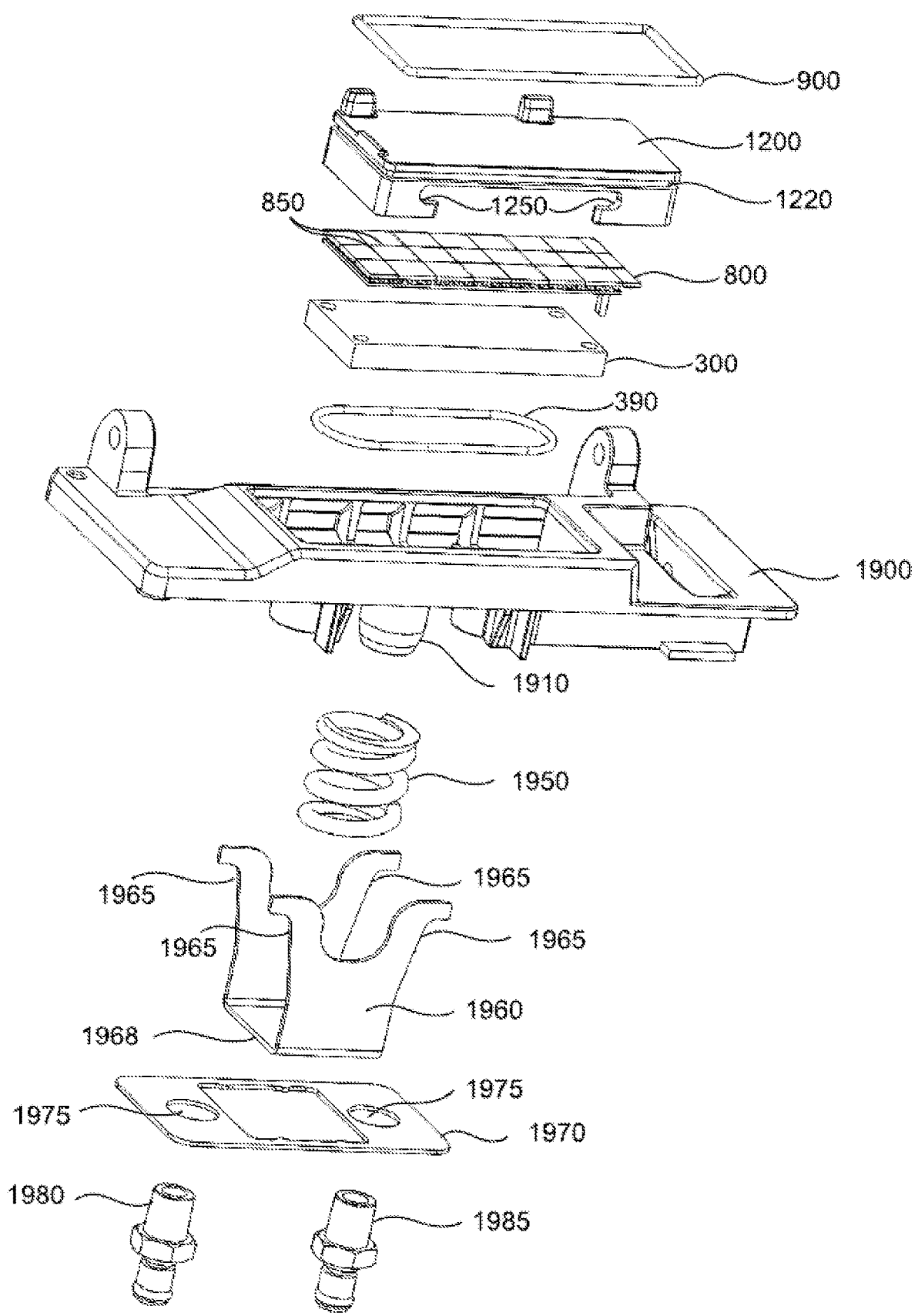
FIG. 15 is an exploded view of components of a thermal system according to an embodiment of the present invention.
Figure 16:
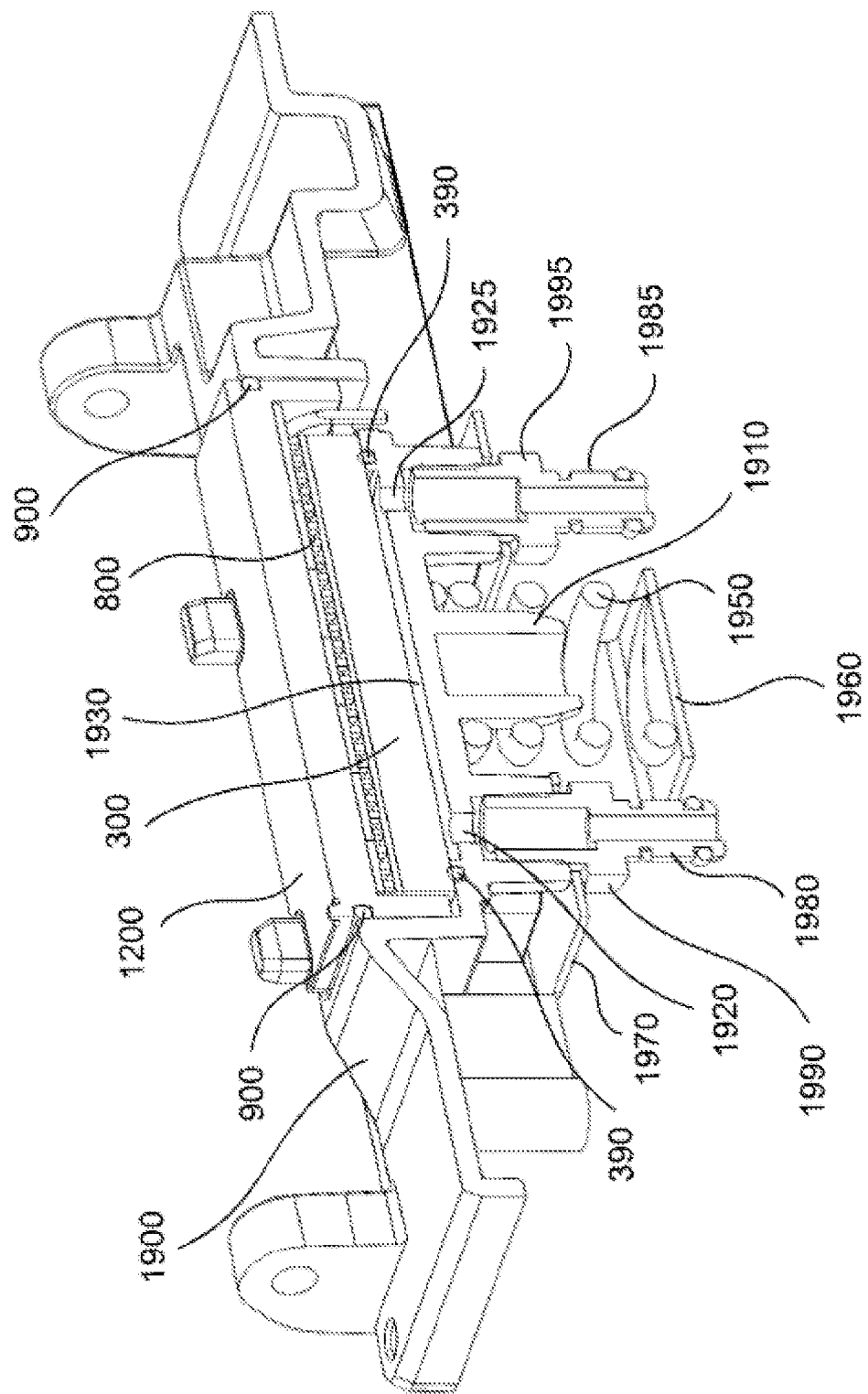
FIG. 16 is a side sectional view of the components of the thermal system in FIG. 15 in an assembled condition.
Figure 17:
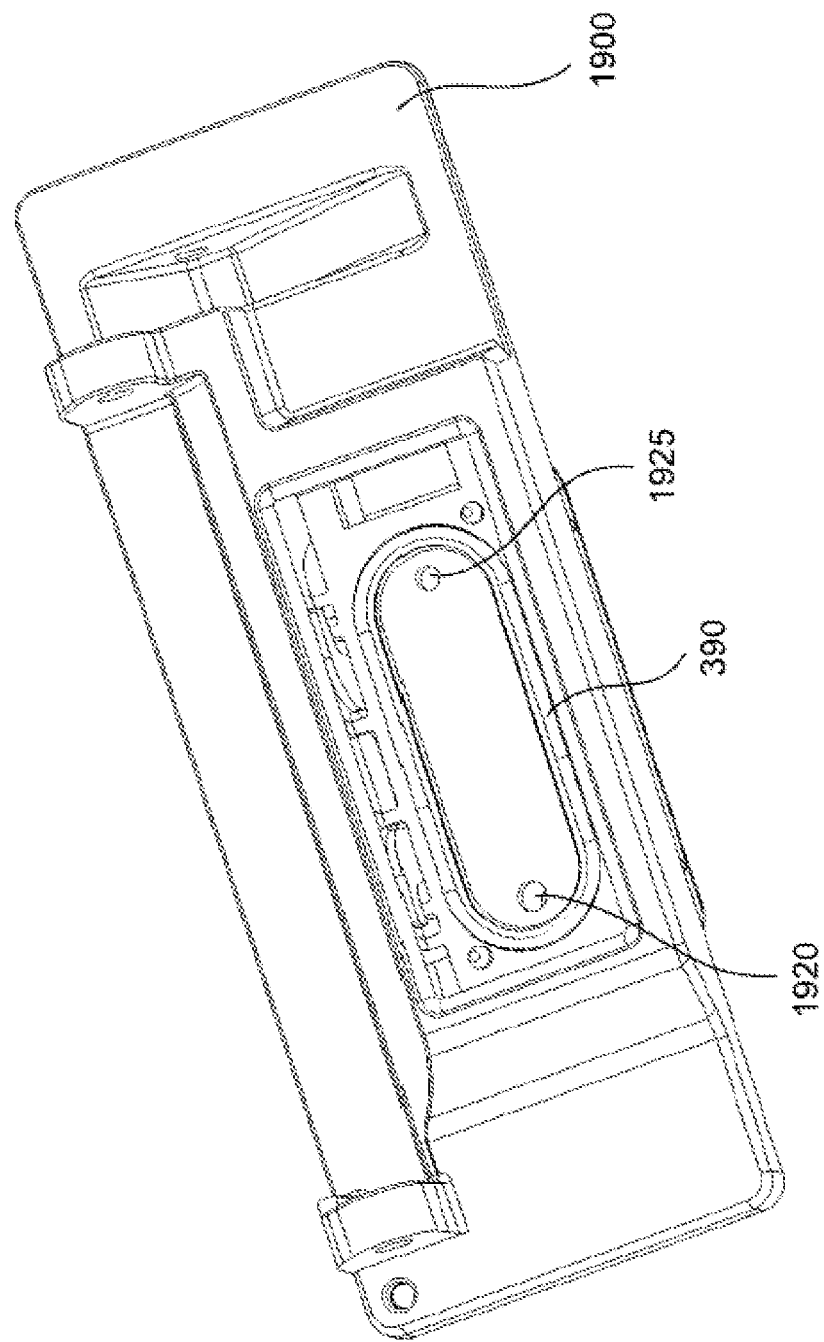
FIG. 17 is top view of the thermal system of FIGS. 15 and 16.

Now, referring to FIG. 15 to FIG. 17, exploded isometric, side sectional and top views respectively are presented to show another embodiment of the invention highlighting a layered construction of the thermal module. Base plate 1900 forms the main component to which retaining means are coupled on one side (below) and to which the thermal generator and thermal transfer layer are coupled on the other side (above).

The retaining means is provided by resilient member (spring) 1950 which during assembly, fits over protrusion 1910 of base plate 1900 and is compressed by retaining clip 1960. The retaining clip has legs 1965 that extend through an opening in base plate 1900 and terminate in foot ends cooperate with a retaining lip 1250 in the underside of heat spreader 1200. When assembled, the biasing force (of up to 150 kg or more) of spring 1950 draws the foot ends of retaining clip 1960 toward base 1968 of retaining clip 1960. This base may be reinforced and/or formed of a thicker, more rigid structure than other features of the retaining clip to limit or prevent deformation caused by the significant biasing force of spring 1950. Thus, the retaining clip 1960 may be a unitary piece, a reinforced piece, or comprised of separate elements coupled or assembled together, to provide the desired retaining functionality.

In some embodiments, optional bracket 1970 is provided to support base 1968 of retaining clip 1960. Bracket 1970 is held in place by fluid port connector pieces 1980, 1985 which extend through openings 1975 in the bracket and have external threads (not shown) for engaging corresponding openings in the underside of base plate 1900 to hold the connectors in place. Simultaneously, lumens within fluid port connectors 1980, 1985 couple with inlet port 1920 and outlet port 1925 in the base plate 1900, between which extends a void forming a cooling chamber 1930 through which fluid may flow.

Base plate 1900 includes a recessed area into which an O-ring 390 is placed which in turn and is covered by a heat sink 300. During use, fluid flow through cooling chamber 1930 can be controlled by controller 4400 to draw heat from the heat sink 300 to influence the thermal behaviour of the Peltier 800 sitting above it. A thermal interface material such as graphite foil or the like may or may not be provided between heat sink 300 and Peltier 800 and/or Peltier and thermal transfer layer 1200, to enhance thermal coupling. The heat sink 300 may comprise copper or a thick piece of aluminium or other thermally conductive material. In other embodiments, the heat sink 300 may comprise metallic foam, e.g. aluminium foam such as Duocel®.

Peltier 800 is shown with cross-hatching 850 on the ceramic layer facing thermal transfer layer 1200 onto which a substrate is placed during use. Cross-hatching or other stress relieving features improve reliability of the Peltier by relieving stress and/or strain on the rigid structures internally of the Peltier that occur during thermal cycling. The stress-relieving structures may be e.g. cross-hatchings etched or cut into the outward-facing surface of the ceramic Peltier plates. In some embodiments the cuts are through the entire thickness of the ceramic layer, forming an array of ceramic tiles such as the 3×8 tile array shown in Peltier 800 of FIG. 15. These features relieve stresses and/or strains on the Peltier during use, e.g. due to thermal expansion, further increasing reliability of the Peltier device.

The stress relieving features together with retaining means described above, particularly when retaining forces are provided along a longitudinal dimension of the device, limit bowing of any of the layers, such as the Peltier and thermal transfer layer, and improve reliability of the device as a whole by reducing the risk of fractures and microfractures occurring in the Peltier. In other embodiments, clamps and/or springs, clips and screws may be provided along an elongate dimension of the thermal module to achieve the requisite retaining force to prevent fluid leakage and/or thermal losses.

Performance may be enhanced by configuring the Peltier to generate more heat (say, 1 to 2 degrees) toward the edges of the cross-hatched area, to compensate for heat loss occurring toward the edges of thermal transfer layer 1200 due to conductivity and/or environmental/atmospheric exposure. This may be achieved by configuring the Peltier with larger semiconductor pairs at the edges, thereby increasing heating capacity. Alternatively/additionally extra thermal features may be incorporated such as resistive heaters (e.g. wire elements) positioned around the periphery of the thermal transfer layer.

Typically, the thermal transfer layer 1200 behaves as a heat spreader, transferring heat from the Peltier 800 evenly across the substrate. Any thermally conductive material may be used for the heat transfer layer 1200, such as aluminium, although it is desirable that the chosen material is corrosion and/or scratch resistant to have minimal impact on the ability to position a substrate on the assembly prior to use. Ideally, the thermal transfer layer includes a recess 1220 for receiving a sealing member such as a gasket or O-ring 900 to prevent fluid from the reaction chamber from reaching the Peltier. Similarly, O-ring 390 is provided to prevent fluid from the fluid cooling chamber from reaching the Peltier from below. Alternatively/additionally the Peltier 800 may be hermetically sealed from fluid in the system by encapsulation.

In some embodiments, an additional sealing member (not shown) is provided between heat spreader 1200 and base plate 1900 to block ingress of fluid (including gas) into the Peltier 800. The additional sealing member may be a gasket, O-ring or other suitable sealant providing hermetic protection for the Peltier. It is desirable that the additional sealing member has low permeability to gas and/or vapour. An over-moulding may also be provided to accommodate electrical connectors and/or metal probes for Peltier control.

In a preferred embodiment, controller 4400 is programmable with one or more heating/cooling profiles for controlling the rate of heating and/or cooling of the thermal module during sample processing. Different staining protocols performed by instrument 4000 may require different heating/cooling profiles according to e.g. the tissue, reagents and processing steps that are used. However, variations in heating and cooling rates can have an impact on staining quality and consistency. Heating/cooling profiles may be defined and stored on board the instrument 4000 (or uploaded from time to time, or controlled by an operator) for particular tissues, reagents, protocols and the like. Heating/cooling profiles may be defined by e.g. a temperature-time curve which specifies the required rate of heating or cooling. Ideally, a plurality of sensors in the thermal module provide high frequency feedback to a controller on the device which facilitates deterministic control over the thermal performance of the device in accordance with the defined temperature-time curves. This ensures that a sample will experience the same thermal treatment during processing, irrespective of the individual thermal module and indeed, instrument, being used.

Placement of one or more sensors in the underside of the heat spreader 1200 on which sample substrates (slides) sit is likely to mitigate sensor damage from contact with reagents and the like. Ideally such sensors rest in correspondingly shaped voids or nests (not shown) in the underside of the spreader 1200. An adhesive or epoxy may be required to retain the sensors in place, although minimal adhesive is desirable to avoid adversely affecting sensor performance and the need to match thermal expansion rates of the adhesive substance with the heat spreader material.

Where one sensor is provided in the heat spreader, it is preferably located centrally of the heat spreader area. Where two sensors are provided, it is preferred that they are located at substantially opposing longitudinal ends of the device. Where multiple sensors are used, there is built in redundancy which may be critical to ensuring deterministic thermal profiles. Where multiple sensors are used, an average of their individual values may be used in controlling thermal treatment during processing. Beneficially, use of sealing members such as O-rings and the like isolate sensors in the heat spreader 1200 from fluids in the reaction chamber. Ideally, at least one sensor is also provided in the heat exchanger 300.

As shown in FIGS. 3 and 4, a sample processing assembly 1000 may incorporate or operate with a thermal module 1800. Thermal module 1800 is operable, preferably under control of a controller 4000, to vary the temperature within reaction chamber 5000 formed by a cover member 2000 retained by assembly 1000 when in a closed position. Temperature control is necessary for some processing steps and individual control of each thermal module 1800 associated with each sample processing assembly 1000 gives rise to enhanced staining and improved scheduling capabilities on board an instrument 4000 of the kind featured in FIG. 5. Here, instrument 4000 is configured with a plurality of sample processing assemblies 1000 each of which may be conducting entirely different sample processing assays.

Typically, the instrument 4000 houses containers of reagent 4200, 4250, typically fluid reagent, of the various types that are required to complete the processing steps controlled by the controller 4400. A robotic dispensing head 4100, 4150 is coupled to containers 4200, 4250 by a fluid distribution system (tubing between the containers and the head) and dispenses fluid into a sample processing assembly 1000 using a probe. Fluid may also be dispensed from reagent containers 4200, 4250 on board the instrument 4000 via the fluid distribution system absent the probe, i.e. using tubing. A probe and robotic dispensing system are described in U.S. provisional patent application No. 61/721,269 filed on 1 Nov. 2012 and International patent application PCT/AU2013/001264 filed on 1 Nov. 2013, both entitled "A Fluid Transport System", the entire contents of both which are hereby incorporated herein by reference. There is also a waste system with waste reservoir 4300 for disposing waste reagent that may be collected from a sample processing assembly 1000 and/or various wash stations in the instrument. The instrument may recycle some reagents, or may collect some reagents for recycling or disposal off-board the instrument.

Ideally, controller 4400 forms part of instrument 4000 and has an input device for a user to specify sample processing requirements. It is to be understood, however, that controller 4400 need not be located on board instrument 4000. It is contemplated that controller 4400 (or aspects of it) may be located remotely and communicate with instrument 4000 via a wired or wireless communication infrastructure. Controller 4400 may be provided in the form of a single computerised control unit or chip, or it may refer to a number of controller elements that together, control aspects of operation of instrument 4000. In any event, controller 4400 ideally controls each thermal module 1800 in instrument 4000 according to the treatment steps that are required for the associated sample processing assembly 1000, independently of the other thermal modules.

In some embodiments, temperature control is done locally at the thermal module 1800 with a required temperature set point being received from instrument controller 4400 e.g. via a CAN bus. CAN enables various modules to be included/removed from the system without reconfiguration. This requires only 4 wires to be routed to each of the thermal modules, and these can be common wires for all sample processing assemblies (2 wires for power, and 2 wires for communications). This is a significant reduction to the 11 wires, 9 of which are unique (2 wires for sensors, 4 wires for control, 2 wires for power, and 3 wires for fans) required for other communication architectures.

Since each thermal module 1800 is individually controllable for use with individual ones of the sample processing assemblies 1000, in the event that one of the modules becomes inoperable or enters an error state, it will not affect the temperature treatment of other samples being processed by other assemblies 1000 within instrument 4000. When an individual thermal module 1800 becomes inoperable it is readily interchangeable by decoupling the thermal module from the assembly and swapping it with a replacement thermal module. Once removed, each thermal module 1800 is itself readily disassembled due to its stacked construction. Examples of various stacked thermal modules are illustrated in FIGS. 6 to 13. Thus, if a thermal generator 800 in a thermal module 1800 requires replacement, it can be removed from the disassembled module and replaced with a functioning thermal generator without the replacing the entire thermal module. This leads to minimal instrument downtime whilst also reducing waste since only the interchanged element of thermal module 1800 requires replacement. Ideally, functional contact between the stacked components of the thermal module is maintained by way of clamp means such as a clamp, threaded screw or spring clip which holds the stacked elements together for optimal performance (thermal transfer) of the thermal module during use. Further, it is desirable that the stacked components are configured such that assembly can be performed easily reducing the possibility of assembly error.

The thermal system described herein may form part of a two stage thermal system built into instrument 4000. The two stage thermal system is comprised of a plurality of primary thermal modules 1800 associated with individual ones of a plurality of sample processing assemblies 1000 in instrument 4000 as discussed above, and a secondary thermal generator 4600 which is adapted to modify the temperature of one or more samples, typically disposed on individual substrates 6000, when located in a thermal buffer region 4500 of the instrument. Ideally, secondary thermal generator 4600 is configured for baking samples on substrates as a pre-cursor to treatment in individual sample processing assemblies 1000. Thus, secondary thermal generator 4600 is able to raise sample temperatures from ambient temperature to up to between 40° C. and 75° C. For most samples, a baking temperature of about 60° C.+/−2° C. or +/−5° C. may be suitable.

Ideally, a platform is provided in buffer region 4500 to support a plurality of substrates 6000 during heating by the secondary thermal generator 4600. The secondary thermal generator may also be controlled by controller 4400 which is programmed to control the temperature within the buffer region and duration for which that temperature is maintained. A heat exchanger may also be provided with the secondary thermal generator to assist with cooling the samples (if necessary) at the conclusion of heating using the secondary thermal generator.

In one embodiment, the secondary thermal generator 4600 is provided in the form of a Positive Temperature Coefficient (PTC) heater. PTC heaters are relatively simple and reliable self-regulated resistive-type heaters that have a maximum warming temperature and do not, therefore, require safety features to limit over-heating. They are relatively inexpensive and generate the gross temperature changes required for samples in the buffer region in satisfactory time frames. Other forms of heater such as ceramic and rod/cartridge heaters may alternatively/additionally be employed in the secondary thermal generator.

Figure 6:
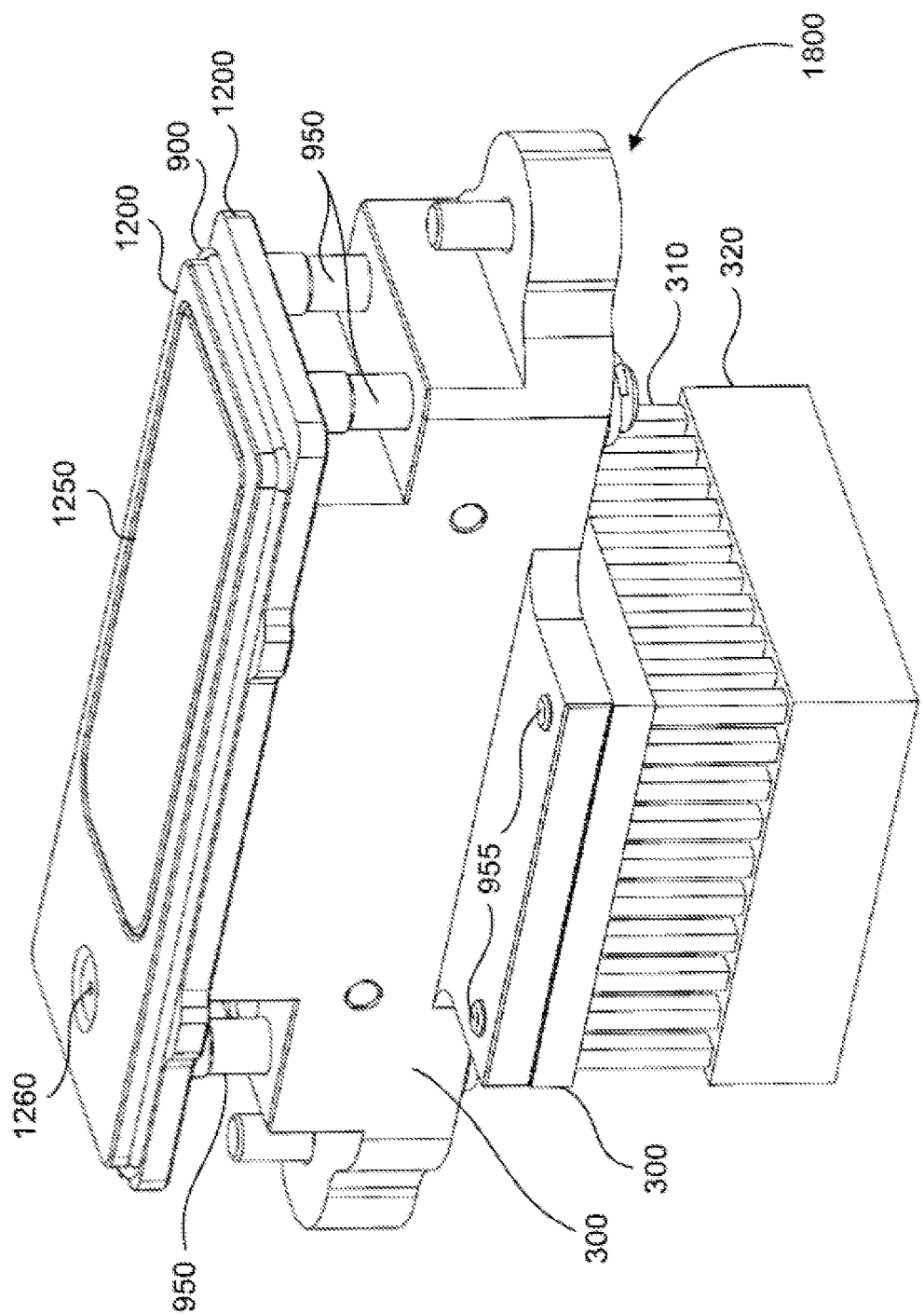
FIG. 6 is a schematic illustration showing features of a thermal system according to an embodiment of the present invention with a heat exchanger including a heat sink.
Figure 7:
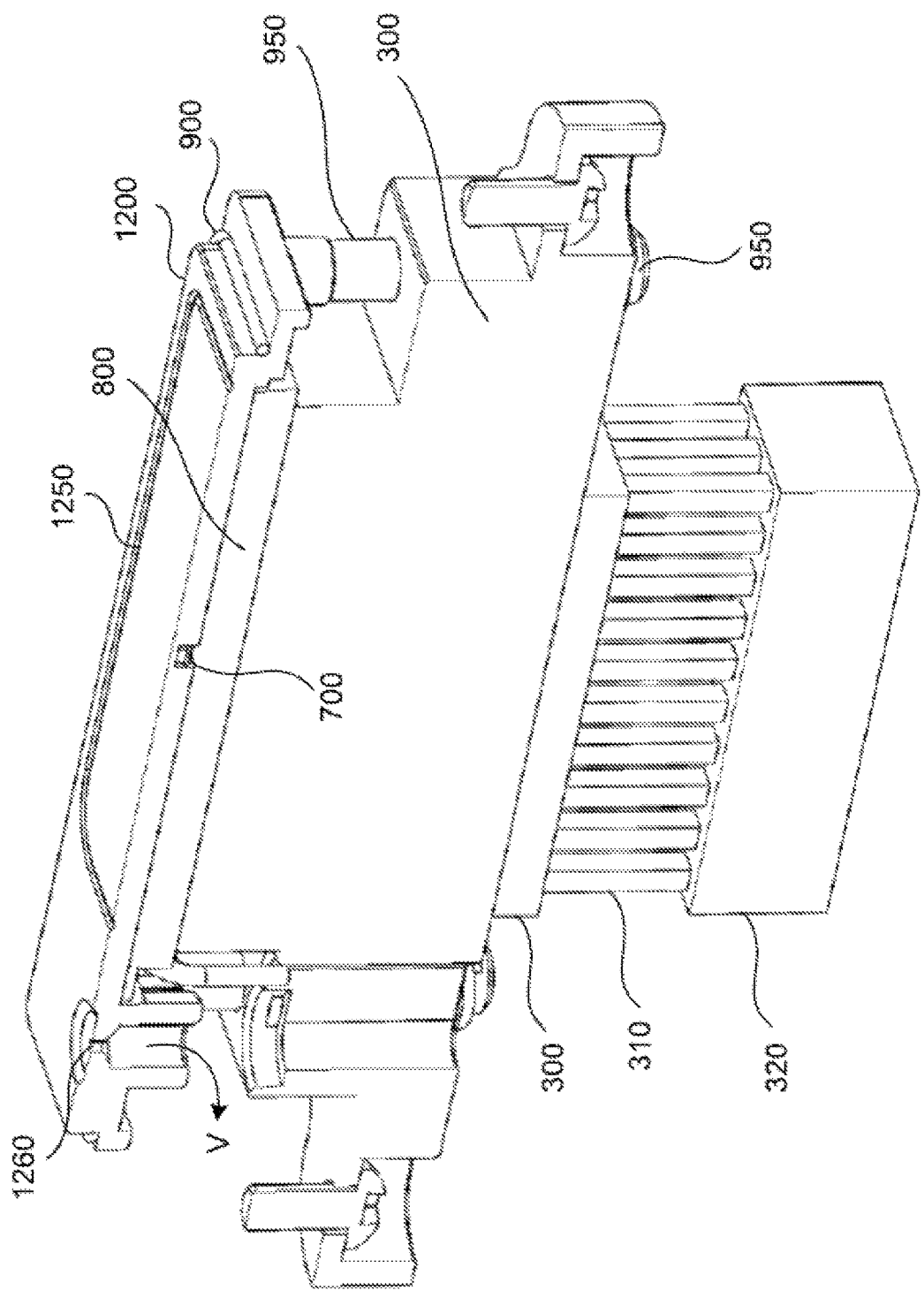
FIG. 7 is a section view of the thermal system shown in FIG. 6.

Referring now to FIGS. 6 and 7, an example of a thermal module 1800 is shown in isometric view and a sectional isometric view respectively. Transfer layer 1200 is provided with recess 1250 and fluid flow opening 1260 which is coupled to a vacuum source indicated by V. Sensor 700 is provided in a recess which is etched into the underside of transfer layer 1200 for sensing, indirectly, the temperature within the reaction chamber formed over the transfer layer when cover member 200 is in place.

Thermal generator 800 is a Peltier device situated between transfer layer 1200 and heat exchanger 300. Clamp means in the form of screws 950 maintain functional contact between the transfer layer and thermal generator. Additional fasteners 955 maintain contact between stacked features of the heat exchanger. Fluid isolator 900 extends around the periphery of transfer layer 1200 to preclude fluid flow into the thermal generator. Heat exchanger 300 is provided in conjunction with heat sink 310 and fan unit 320 which exchanges air past the heat sink to cool the fins which in turn draw heat away from the thermal module when required. Fan cooling the Peltier thermal module can achieve reductions in temperature from about 100° C. to about 23° C. in one to two minutes. This is a significant improvement upon air cooling using traditional techniques where a comparable drop in temperature can take as long as 5 to 7 minutes.

Figure 8:
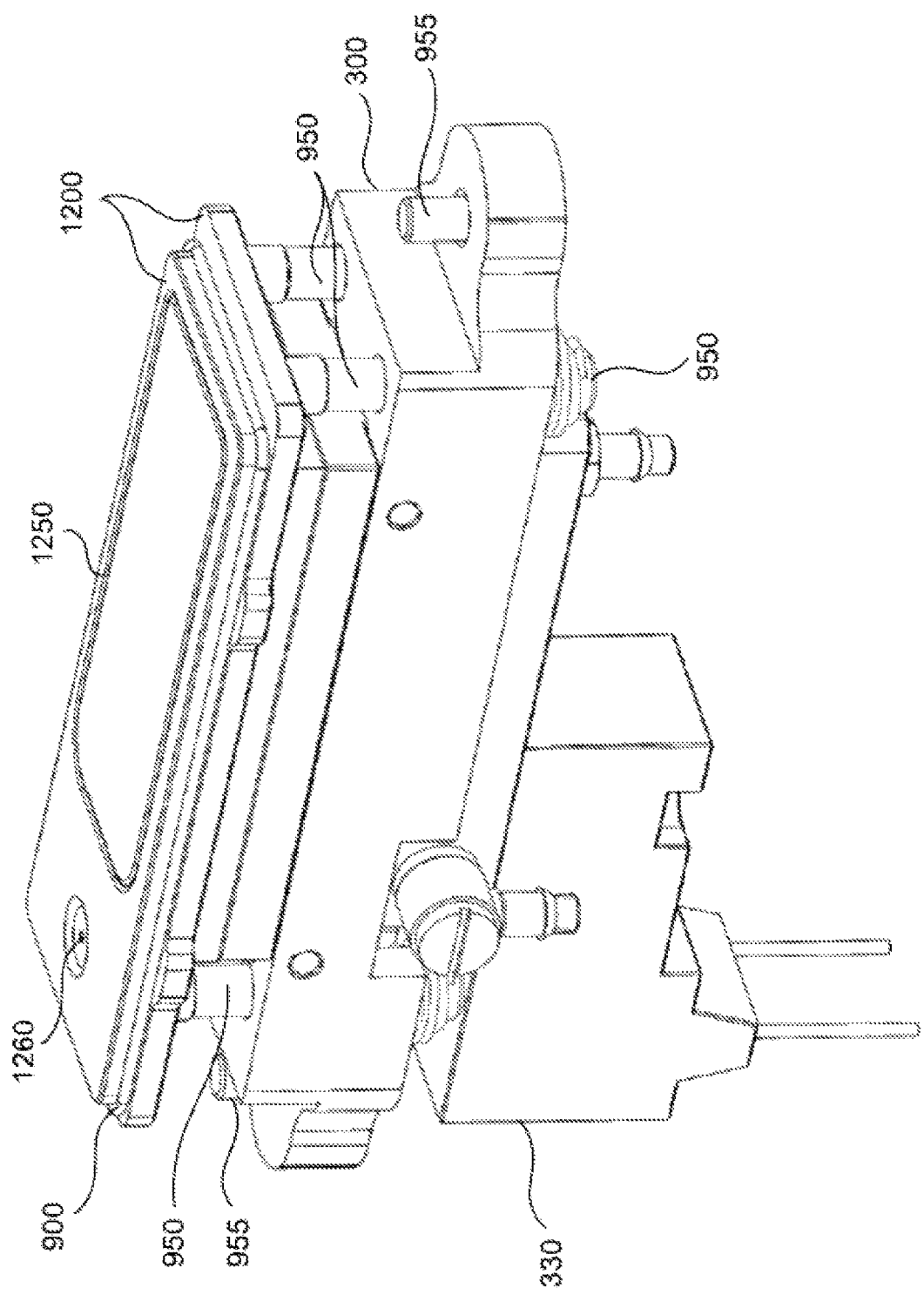
FIG. 8 is a schematic illustration showing features of a thermal system according to another embodiment of the present invention, including a fluid-cooled heat exchanger.
Figure 9:
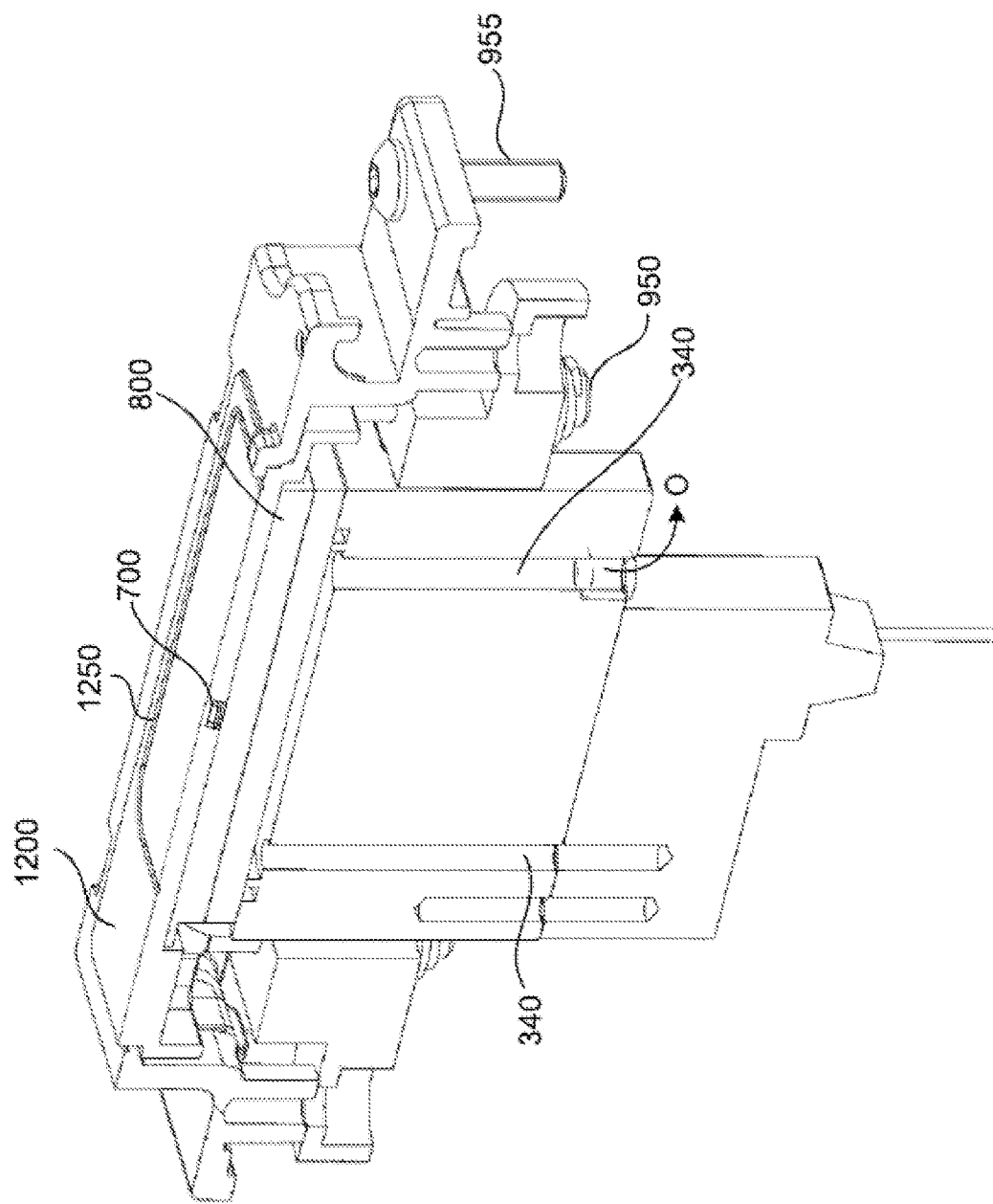
FIG. 9 is a section view of the thermal system shown in FIG. 8.

FIGS. 8 and 9 provide an example of a modified version of the thermal module of FIGS. 6 and 7, in which heat exchanger 300 includes fluid cooling. Again, FIG. 8 shows the thermal module in isometric view and FIG. 9 is a sectional view through the representation in FIG. 8, showing sensor 700 provided in a recess etched into the underside of transfer layer 1200. Peltier 800 is retained in functional contact with transfer layer 1200 using screws 950 and further fasteners 955 are provided to couple the thermal module with a sample processing assembly with which the thermal module is used. Fluid flow through flow path 340 is regulated by a valve (not shown) operated under control of controller 4400 according to the heating and cooling requirements applicable to the thermal module. Fluid cooling the Peltier thermal module can achieve reductions in temperature from about 100° C. to about 23° C. in less than a minute. This is demonstrates even greater improvement over traditional air cooling. The discussion of FIG. 14 provides further detail on how heating and cooling efficiency may be enhanced according to embodiments of the invention.

Figure 10:
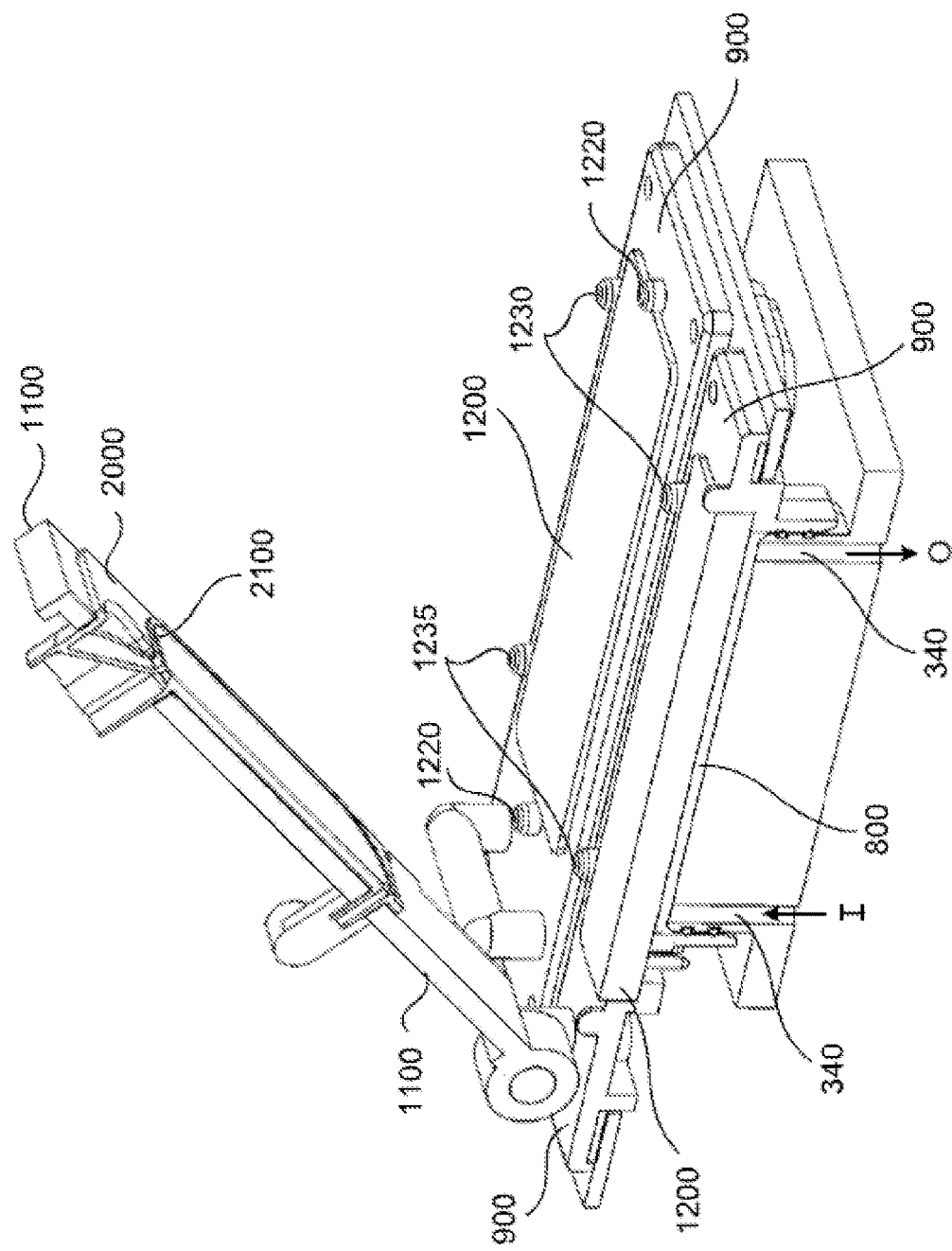
FIG. 10 is a schematic illustration showing features of a thermal system according to yet another embodiment of the present invention, servicing adjacent sample processing assemblies.
Figure 11:
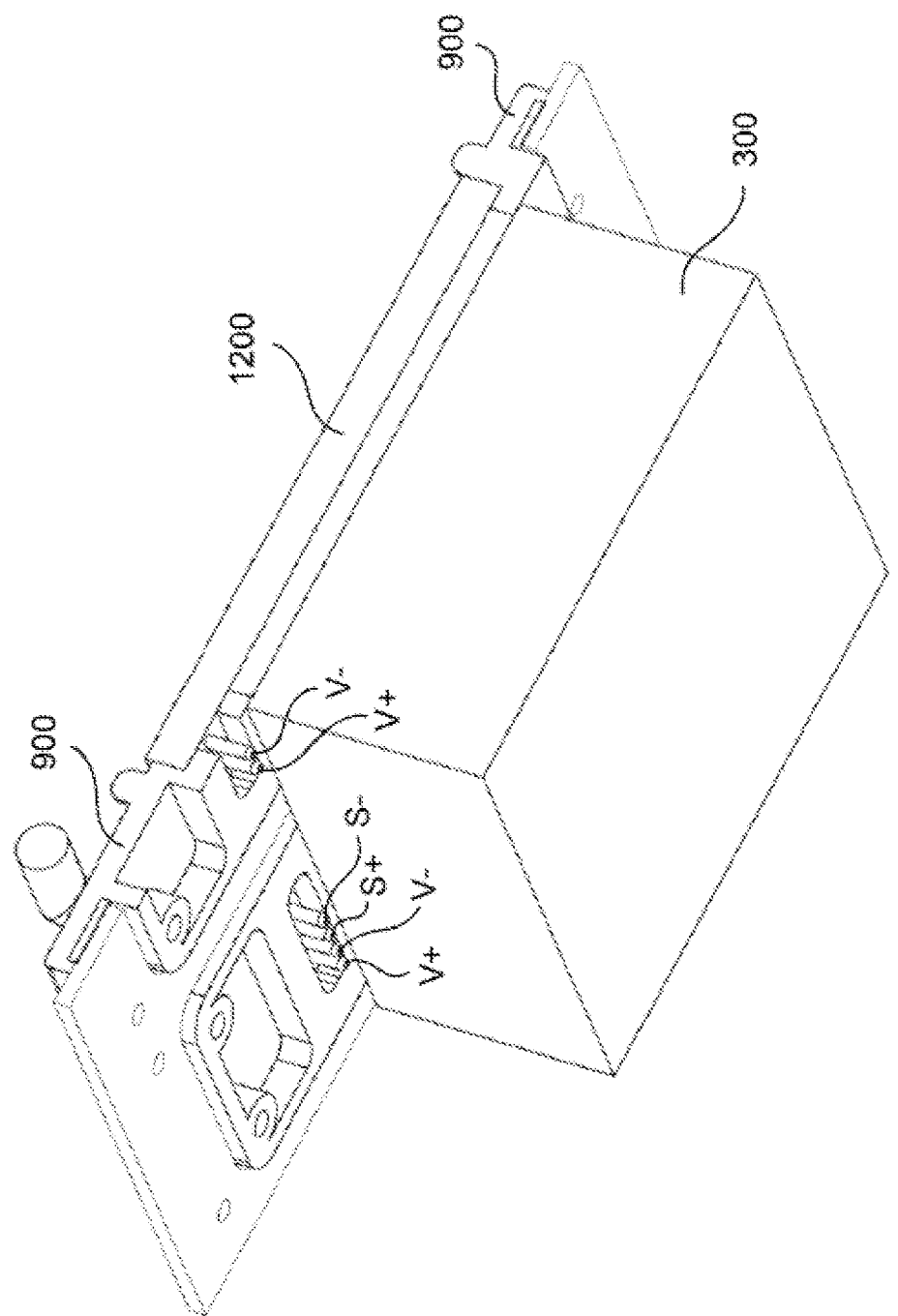
FIG. 11 is a schematic illustration showing features of a thermal system according to another embodiment still, servicing adjacent sample processing assemblies and viewed from below.

FIG. 10 is an example of a thermal module 1800 in which the thermal generator 800 is a ceramic heater in the form of a ceramic plate with heated elements embedded therein. FIG. 10 shows two adjacent thermal modules, one of which is shown in section and with a cover member 2000 retained in a closure body 1100 of a sample processing assembly. The adjacent sample processing area does not have a closure body (or cover member) attached. The ceramic heater 800 is fluid cooled, with controller 4400 controlling inflow of cooling fluid through inlet I and outlet of warm fluid through outlet O. Fluid can be driven into and/or drawn through the channel 340 using a pump and/or valve arrangement under the control of controller 4400, or using hydrostatic methods. FIG. 11 shows an underside of the thermal modules shown in FIG. 10, with a cover member applied over the fluid cooler and designated 300 (heat exchanger). Sensor 700 is incorporated into the ceramic heater plate which is supplied with power through power supply jacks V⁺ and V⁻. Temperatures may be sensed by attaching a thermistor across sensor jacks S⁺ and S⁻. Alternatively, resistance may be monitored as an indirect indicator of temperature as discussed above.

Ceramic heaters are relatively responsive, providing short temperature ramp times and are advantageous because they provide integrated temperature sensing. A benefit of this is that no separate sensor 700 is required as the sensor is built into the heater itself and is therefore chemically inert and does not require fluid isolation from reagent used in the sample processing assembly. Furthermore, ceramic heating pads are generally not susceptible to degradation when contacted by acidic and caustic reagents that are often used to process samples as described herein.

Figure 12:
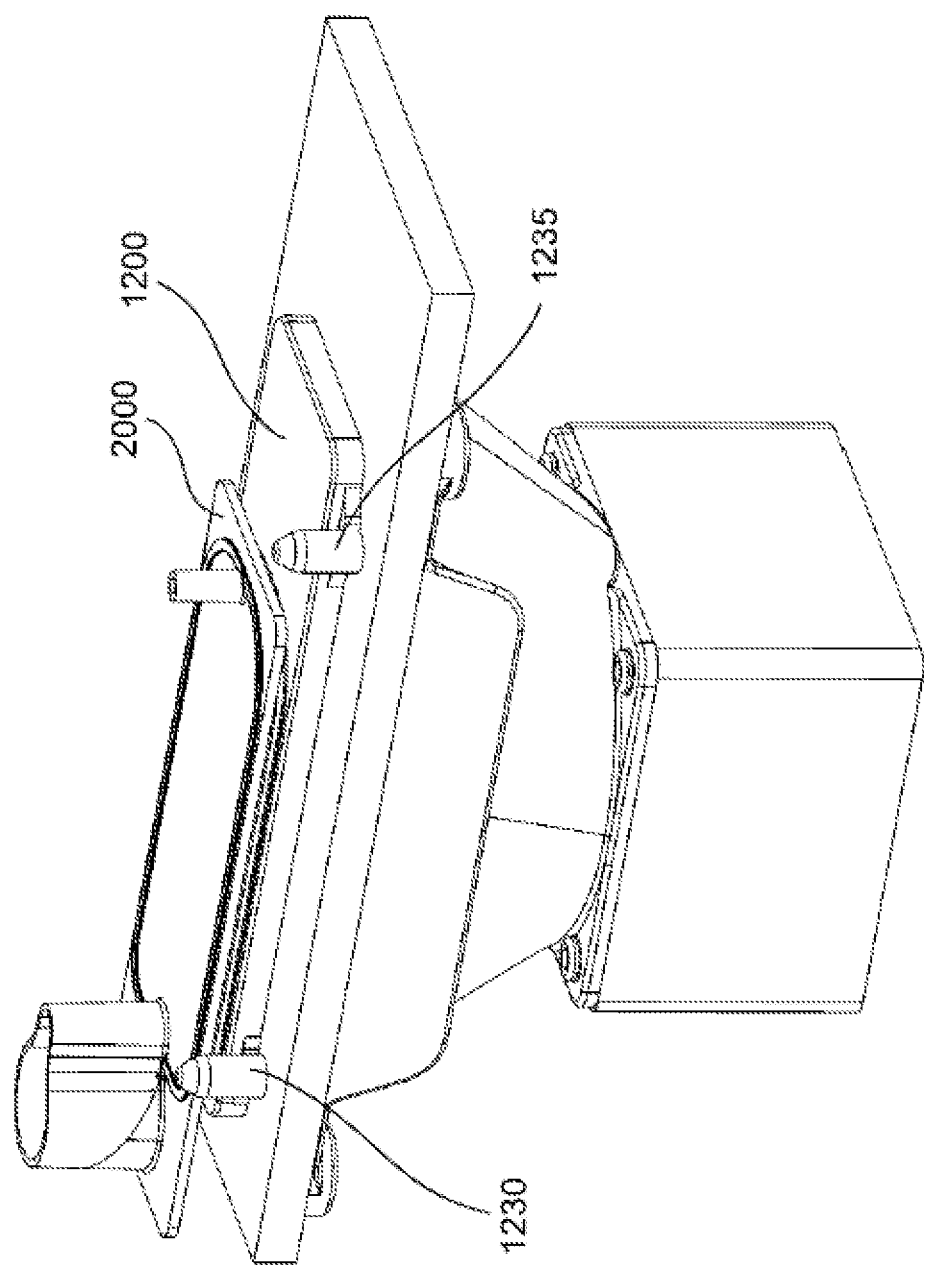
FIG. 12 is a schematic illustration showing features of a thermal system according to yet another embodiment of the present invention.
Figure 13:
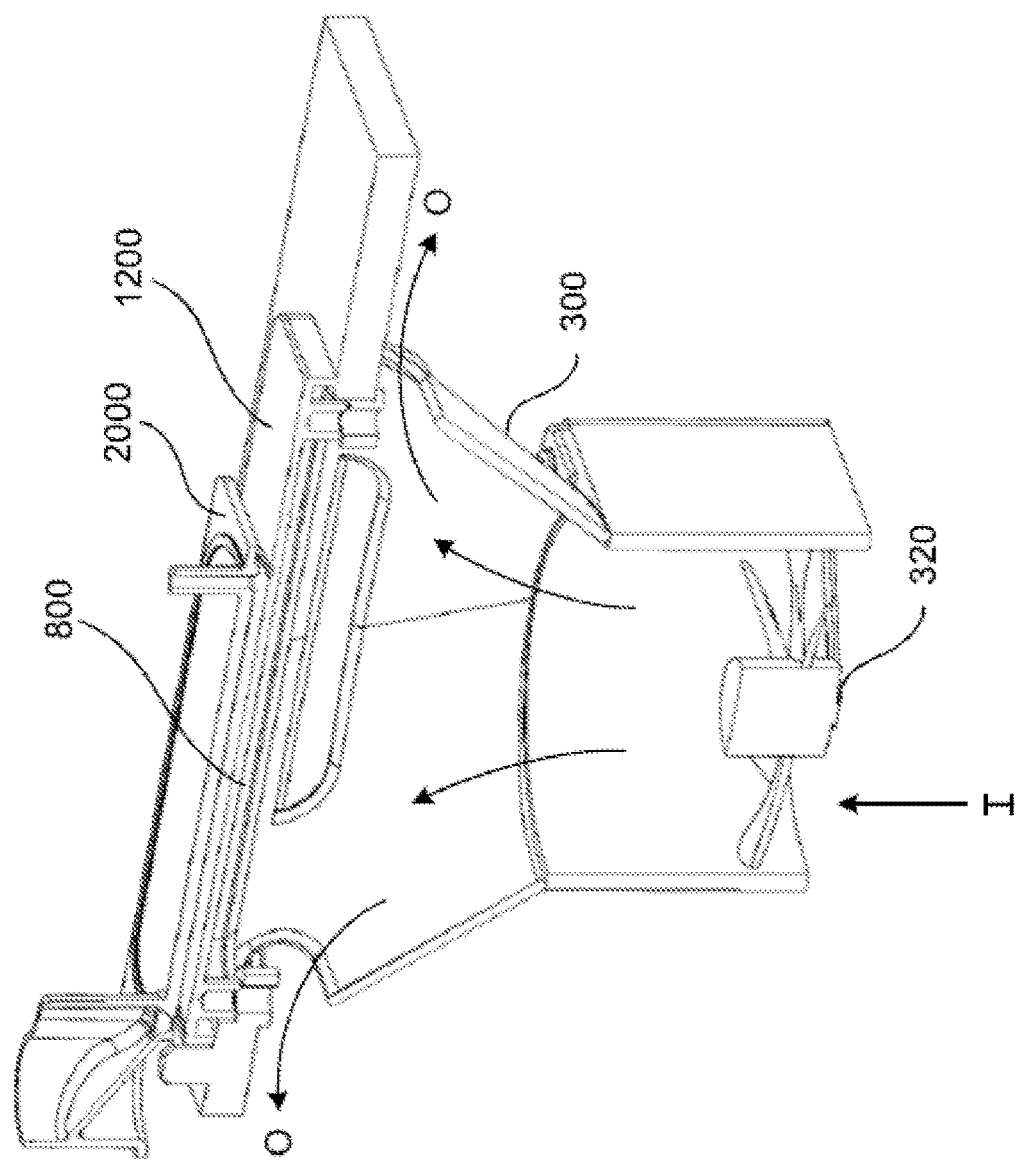
FIG. 13 is a section view of the system in FIG. 12 showing the heat exchanger including a fan.

FIGS. 12 and 13 illustrate an example of a thermal module using a heatable resistive film as the thermal generator 800. FIG. 12 shows the module in isometric view while FIG. 13 is a sectional view showing heatable resistive film 800 applied to the underside of transfer layer 1200. Alternatively, a ceramic heating pad may be employed in place of the film 800. Fan cooling is used to blow cool or ambient air in through inlet I, past fan unit 320 and releasing heat exchanged air through outlets O.

Cartridge or rod heaters may also be used in some embodiments, where heatable elements or "rods" are placed in the body of the thermal generator and an electric current applied to heat the elements. A water jacket or cooling shroud may be machined into the body surrounding the rods so that active cooling can be instigated by flushing cooling fluid or water through the jacket, drawing heat away from the cartridge. Expansion zones may be provided to accommodate expansion of the rods when heated. The cartridge style heater may be incorporated into a thermal module designed for use with individual sample processing assemblies. However such a heating device may be more amenable to use in a secondary thermal generator of the kind use to heat samples in the buffer region of a sample processing instrument.

Providing distinct heating zones for individual sample processing assemblies 1000 and a secondary heating zone in buffer region 4500 enables rapid preparation of multiple samples e.g. by baking separately from protocol-specific histological processing.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components or group thereof.

It is to be understood that various modifications, additions and/or alterations may be made to the parts previously described without departing from the ambit of the present invention as defined in the claims appended hereto.

The claims defining the invention are as follows:

1. A thermal system for controllably altering a temperature within a reaction chamber in a sample processing assembly, wherein the reaction chamber is bounded by a substrate and cover member in the sample processing assembly, the thermal system including:
   at least one thermal generator for generating temperature changes;
   one or more transfer layers for transferring temperature changes between the thermal generator and the sample on the substrate, the one or more transfer layers being disposed between the thermal generator and the reaction chamber and including a fluid isolator for isolating the thermal generator from excess fluid dispensed into the reaction chamber, the fluid isolator having a plurality of grooves therein in which the excess fluid is received,
   wherein the plurality of grooves are between the thermal generator and the substrate.

2. A thermal system according to claim 1, wherein the at least one thermal generator is selected from a group including but not limited to:
   a Peltier;
   a ceramic heater;
   a heatable rod
   a heatable cartridge; and
   a heatable resistive film.

3. A thermal system according to claim 1, wherein the fluid isolator includes a sealing member between the transfer layer and the thermal generator, the sealing member being configured to substantially preclude fluid ingress into the thermal generator.

4. A thermal system according to claim 1, wherein the fluid isolator includes a fluid impermeable sealing member disposed around a periphery of the transfer layer while permitting contact between the transfer layer and the thermal generator.

5. A thermal system according to claim 4, wherein at least a periphery of the transfer layer has an edge profile shaped to form at least one passage between the grooves and configured to direct fluid away from the thermal generator.

6. A thermal system according to claim 5, wherein a sealing member is disposed around and cooperates with the edge profile of the periphery of the transfer layer.

7. A thermal system according to claim 1, further comprising a fluid impermeable encapsulation layer disposed around the thermal generator.

8. A thermal system according to claim 1, further including a thermal exchanger, where in the thermal exchanger is selected from a group including one or more of:
   a heat sink;
   a fluid-flow cooling system;
   a refrigerated cooling system; and
   a fan.

9. A thermal system according to claim 1, further including one or more sensors for determining a temperature within the reaction chamber.

10. A thermal system according to claim 9, wherein at least one sensor is adapted to be disposed on or in the reaction chamber.

11. A thermal system according to claim 9, wherein at least one sensor is adapted to be disposed on or in the transfer layer.

12. A thermal system according to claim 11, wherein at least one sensor is disposed in one or more locations selected from a group including the following and such that fluid contact with the sensor is substantially precluded:
within the transfer layer;
within the thermal generator;
between the transfer layer and the thermal generator; and
within a thermal exchanger included in the system.

13. A thermal system according to claim 9, wherein the sensor is used to determine the temperature indirectly, using one or more parameters selected from a group including resistance and current trace.

14. A thermal system according to claim 9, wherein the thermal generator includes a heatable resistive film, and the sensor is incorporated into the heatable resistive film.

15. A thermal system according to claim 1, wherein the at least one thermal generator includes a Peltier which includes an array of semiconductor couples, wherein during heating the Peltier is adapted to generate higher temperatures towards its outer edges.

16. A thermal system according to claim 15, wherein the Peltier is configured with larger semiconductor couples towards its outer edges.

17. A thermal system according to claim 1 wherein the at least one thermal generator includes a Peltier which includes an array of semiconductor couples sandwiched between a pair of ceramic plates, wherein at least one of the ceramic plates includes an array of stress-relieving features.

18. A thermal system according to claim 17 wherein the stress relieving features are cross-hatchings provided in a surface of a ceramic plate facing away from the semiconductor couples.

19. A thermal system according to claim 18 wherein the cross-hatchings are cuts formed through an entire thickness of the ceramic plate facing away from the semiconductor couples.

20. A thermal system according to claim 1, including a control interface adapted to communicatively couple the thermal generator with a controller adapted to control temperature changes generated by the thermal generator.

21. A thermal system according to claim 1, wherein the transfer layer includes one or more recesses adapted to be arranged substantially co-linearly with at least part of an interior wall of a cover member when retained by the sample processing assembly in a closed configuration, the one or more recesses facilitating cleaning of reagent from at least part of the cover member interior wall.

22. A thermal system according to claim 1, wherein the transfer layer includes one or more expansion structures causing one or more edge portions of the transfer layer to heat faster than a centre portion thereof.

23. A thermal system according to claim 22, wherein the one or more expansion structures are selected from a group including a void, channel, rut or opening.

24. A thermal system according to claim 1 wherein the at least one thermal generator includes a self-regulating resistive heater, wherein changes in resistivity are indicative of a sample temperature and directly control power delivered to the heater to achieve a required temperature set point.

25. A thermal system according to claim 1, wherein the transfer layer includes an opening couplable with a fluid flow path facilitating fluid transfer between the opening and a fluid source.

26. A thermal system according to claim 1, including one or more first guide means disposed on the transfer layer and configured to limit movement of a substrate in at least a first direction during placement of a substrate on the transfer layer.

27. A thermal system according to claim 26, including one or more second guide means on disposed on the transfer layer and configured to limit movement of a substrate in at least a second direction, different to the first direction, during placement of a substrate on the transfer layer.

28. A thermal system according to claim 1, wherein at least the thermal generator and the transfer layer are incorporated into a thermal module, and wherein each of a plurality of thermal modules is adapted for use with individual ones of a plurality of sample processing assemblies provided in a sample processing instrument which is controllable to process samples disposed on individual substrates located in individual ones of said sample processing assemblies.

29. A thermal system according to claim 28, wherein operation of each thermal module is individually controllable by a controller controlling operation of the instrument.

30. A thermal system according to claim 28, wherein a thermal module adapted for use with an individual one of said sample processing assemblies is interchangeable independently of other thermal modules provided in the instrument.

31. A thermal system according to claim 1, wherein a plurality of components in the thermal system are disposed in a layered construction which is readily dis-assemblable and re-assemblable to interchange parts thereof.

32. A thermal system according to claim 31, including retaining means operable for maintaining functional contact between layered components of the thermal system.

33. A thermal system according to claim 32, wherein the retaining means includes one or more of a clamp, a spring and screw means adapted to increase functional contact between at least two of the thermal generator, the transfer layer and a thermal exchanger when the retaining means is activated.

34. A thermal system according to claim 32, including retaining means adapted to apply a retaining force between stacked components of the thermal system along a longitudinal dimension thereof.

35. A thermal module according to claim 32, wherein the retaining means includes resilient member adapted to be compressed between a transfer layer and a retaining clip on an opposing side of the thermal generator, the retaining clip having a rigid base for contacting the resilient member and legs that are adapted to couple with the transfer layer to retain stacked components of the thermal system in functional contact.

36. A thermal module according to claim 32, wherein the retaining means is adapted to apply a retaining force greater than 80 kg, preferably greater than 100 kg, and more preferably about 150 kg.

37. A thermal system according to claim 1, when incorporated into a two stage thermal system, the two stage thermal system including a secondary thermal generator adapted to alter a temperature of one or more samples disposed on individual ones of individual substrates substantially simultaneously.

38. A thermal system according to claim 37, wherein the secondary thermal generator is disposed in a buffer region of a sample processing instrument which is adapted to move individual ones of said substrates from the buffer region to individual ones of said sample processing assemblies provided in the instrument.

39. A thermal system according to claim 38, wherein the thermal generator is configured to alter a temperature within the buffer region between ambient temperature and about 40 to 75 degrees Celsius.

40. A thermal system according to claim 37 wherein the secondary thermal generator is a Positive Temperature Control (PTC) heater.

41. The thermal system according to claim 1, wherein the fluid isolator further comprises a first fluid channel within the grooves, and
wherein the grooves are configured to wick the fluid, in a first direction from the at least one thermal generator to the slide, into an inner top of the grooves and subsequently from the inner top into the fluid channel, in a second direction opposite the first direction.

42. The thermal isolator according to claim 41, wherein the fluid isolator further comprises a second fluid channel within the grooves and, in the second direction, arranged closer to the thermal isolator than the first fluid channel.

43. The thermal isolator according to claim 1, wherein the plurality of grooves form a plurality of passages within the fluid isolator, the plurality of passages being configured to lead the excess fluid in different directions away from each other and also away from a direction in which the fluid isolator is configured to receive the fluid dispensed into the reaction chamber.

44. A method of warming a sample, the method comprising:
warming the sample on a substrate of a thermal system by controllably altering a temperature within a reaction chamber in a sample processing assembly,
wherein the reaction chamber is bounded by a substrate and cover member in the sample processing assembly,
wherein the thermal system includes:
at least one thermal generator for generating temperature changes;
one or more transfer layers for transferring temperature changes between the thermal generator and the sample on the substrate, the one or more transfer layers being disposed between the thermal generator and the reaction chamber and including a fluid isolator for isolating the thermal generator from excess fluid dispensed into the reaction chamber, the fluid isolator having a plurality of grooves therein in which the excess fluid is received, and
wherein the plurality of grooves are between the thermal generator and the substrate.

* * * * *